US 8,527,882 B2

(12) United States Patent
Swartz

(10) Patent No.: US 8,527,882 B2
(45) Date of Patent: Sep. 3, 2013

(54) SYSTEM AND METHOD FOR ICONIC SOFTWARE ENVIRONMENT MANAGEMENT

(75) Inventor: Gregory J. Swartz, Anthem, AZ (US)

(73) Assignees: Gregory J. Swartz, Carmel, IN (US); Natalie Swartz, Carmel, IN (US), Legal Representative ( * ) Notice: Subject to any disclaimer, the term of this patent is extended or adjusted under 35 U.S.C. 154(b) by 1020 days.

(21) Appl. No.: 12/077,106

(22) Filed: Mar. 17, 2008

(65) Prior Publication Data

US 2008/0201307 A1    Aug. 21, 2008

Related U.S. Application Data

(63) Continuation-in-part of application No. 09/878,009, filed on Jun. 8, 2001, now Pat. No. 7,346,850, which is a continuation of application No. 09/097,283, filed on Jun. 12, 1998, now abandoned.

(51) Int. Cl.
*G06F 3/00* (2006.01)
*G06F 17/30* (2006.01)

(52) U.S. Cl.
USPC ........... 715/738; 715/200; 715/760; 715/764; 707/706

(58) Field of Classification Search
USPC .................. 715/738, 200, 760, 764; 707/706
See application file for complete search history.

(56) References Cited

U.S. PATENT DOCUMENTS

| 5,375,200 A | 12/1994 | Dugan et al. |
| 5,479,599 A | 12/1995 | Rockwell et al. |
| 5,479,602 A | 12/1995 | Baecker |
| 5,517,605 A * | 5/1996 | Wolf ..................................... 1/1 |
| 5,581,760 A | 12/1996 | Atkinson et al. |
| 5,586,237 A | 12/1996 | Baecker et al. |
| 5,657,049 A | 8/1997 | Ludolph |
| 5,657,434 A | 8/1997 | Yamamoto |
| 5,671,380 A | 9/1997 | Hidaka |
| 5,675,752 A | 10/1997 | Scott et al. |
| 5,682,536 A | 10/1997 | Atkinson et al. |
| 5,689,703 A | 11/1997 | Atkinson et al. |
| 5,701,385 A | 12/1997 | Katsuyama |
| 5,717,877 A | 2/1998 | Orton et al. |
| 5,727,139 A | 3/1998 | Owen |
| 5,731,813 A | 3/1998 | O'Rourke |
| 5,751,286 A | 5/1998 | Barber et al. |
| 5,761,655 A * | 6/1998 | Hoffman ............................... 1/1 |
| 5,767,860 A | 6/1998 | Zimmer |
| 5,821,927 A | 10/1998 | Gong |
| 5,894,310 A | 4/1999 | Arsenault |
| 5,911,139 A | 6/1999 | Jain et al. |
| 5,917,499 A | 6/1999 | Jancke |
| 5,973,692 A | 10/1999 | Knowlton et al. |
| 5,995,978 A * | 11/1999 | Cullen et al. .......................... 1/1 |
| 6,002,401 A | 12/1999 | Baker |
| 6,009,442 A * | 12/1999 | Chen et al. ..................... 715/205 |
| 6,012,069 A * | 1/2000 | Shibazaki .............................. 1/1 |

(Continued)

*Primary Examiner* — Tadeese Hailu

(74) *Attorney, Agent, or Firm* — Lesavich High-Tech Law Group, P.C.; Stephen Lesavich

(57) ABSTRACT

A system and method for iconic software environment management. The system and method provide storing, navigating and accessing files within an operating system on a stand alone device or on a networked device with internal files and external files (e.g., from web-sites, etc.) through the use of graphical thumbnail icons representing a graphical display of a substantial portion of information obtained from within an electronic document.

15 Claims, 24 Drawing Sheets

(56) References Cited

U.S. PATENT DOCUMENTS

| | | | |
|---|---|---|---|
| 6,012,072 | A | 1/2000 | Lucas |
| 6,020,920 | A * | 2/2000 | Anderson .................. 348/222.1 |
| 6,026,433 | A * | 2/2000 | D'Arlach et al. ............. 709/217 |
| 6,035,323 | A * | 3/2000 | Narayen et al. ............... 709/201 |
| 6,052,750 | A | 4/2000 | Lea |
| 6,097,389 | A * | 8/2000 | Morris et al. ................. 715/804 |
| 6,097,390 | A | 8/2000 | Marks |
| 6,133,914 | A * | 10/2000 | Rogers et al. ................. 345/661 |
| 6,154,755 | A * | 11/2000 | Dellert et al. ................. 715/202 |
| 6,154,771 | A * | 11/2000 | Rangan et al. ................ 709/217 |
| 6,243,724 | B1 | 6/2001 | Mander |
| 6,275,829 | B1 * | 8/2001 | Angiulo et al. ...................... 1/1 |
| 6,314,406 | B1 | 11/2001 | O'Hagan |
| 7,086,011 | B2 | 8/2006 | Budrys |
| 7,254,772 | B2 | 8/2007 | Penke |
| D550,683 | S | 9/2007 | Wang |
| 7,324,071 | B2 | 1/2008 | Carpinelli |
| 7,346,850 | B2 | 3/2008 | Swartz |
| 2001/0033639 | A1 | 10/2001 | Martin |
| 2006/0212561 | A1 | 9/2006 | Feng |
| 2007/0273550 | A1 | 11/2007 | Price et al. |
| 2008/0046369 | A1 | 2/2008 | Wood |
| 2008/0046437 | A1 | 2/2008 | Wood |
| 2008/0046471 | A1 | 2/2008 | Moore et al. |
| 2008/0052162 | A1 | 2/2008 | Wood |
| 2008/0052343 | A1 | 2/2008 | Wood |
| 2008/0062126 | A1 | 3/2008 | Algreatly |
| 2008/0098301 | A1 | 4/2008 | Black et al. |
| 2008/0108456 | A1 | 5/2008 | Bonito |
| 2008/0114480 | A1 | 5/2008 | Harb |
| 2008/0114664 | A1 | 5/2008 | Harb |
| 2008/0126178 | A1 | 5/2008 | Moore |
| 2008/0177994 | A1 | 7/2008 | Mayer |
| 2008/0194928 | A1 | 8/2008 | Bandic |
| 2008/0195664 | A1 | 8/2008 | Maharajh et al. |
| 2008/0198925 | A1 | 8/2008 | Sayre |
| 2008/0200154 | A1 | 8/2008 | Maharajh et al. |
| 2008/0201225 | A1 | 8/2008 | Maharajh et al. |
| 2008/0201386 | A1 | 8/2008 | Maharajh et al. |

* cited by examiner

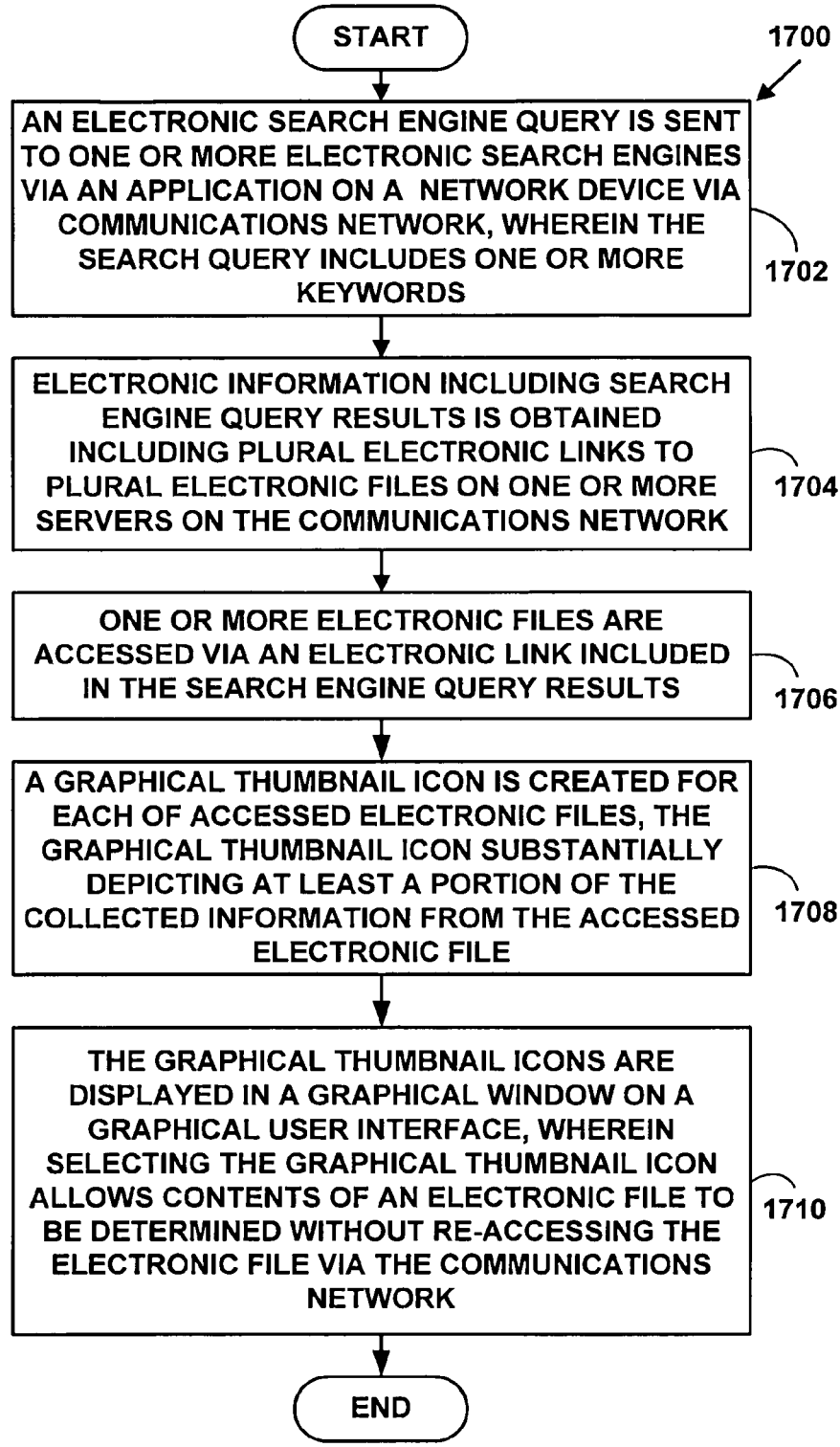

US 8,527,882 B2

SYSTEM AND METHOD FOR ICONIC SOFTWARE ENVIRONMENT MANAGEMENT

CROSS REFERENCES TO RELATED APPLICATIONS

This application is a Continuation-In-Part (CIP) of U.S. patent application Ser. No. 09/878,009, filed Jun. 8, 2001, that issued into U.S. Pat. No. 7,346,850, on Mar. 18, 2008, which is a Continuation of U.S. patent application Ser. No. 09/097,283, filed Jun. 12, 1998, now abandoned, the contents of all of which are incorporated by reference.

FIELD OF THE INVENTION

The present invention relates in general to systems and methods for managing files and documents in a computer system. More particularly, the present invention relates to graphical user interfaces for storing, navigating and retrieving files and documents in a computer system using graphical icons.

BACKGROUND OF THE INVENTION

It is known to provide a graphical user interface (GUI) for application programs on a computer. Early GUIs were provided by applications such as word processors and spreadsheets. GUIs have since been incorporated into computer operating systems, and provide functions such as allowing an operator to access files and programs on the computer by using a mouse to select and activate icons that represent the files and programs. GUIs for accessing files and applications through icons are typically either part of or added to the underlying operating system that manages storage of the files and execution of the applications. For example, the Windows operating systems from Microsoft Corporation, including Windows 3.X, Windows 95, Windows NT, other versions of the Windows operating system and the Macintosh operating systems from Apple Corporation all provide such GUIs.

Continual increases in the amount and complexity of information stored and manipulated by computer systems have required operators to interact with an increasing number of files and applications. The growth of computer networks and the corollary growth in shared data also has increased the amount of information accessible to the operator. Increases in the amount and complexity of information stored by computer systems and networks have also caused concomitant increases in the amount and complexity of the graphical information representing the underlying file system presented to the user by operating system GUIs. Thus, it is desirable to manage documents via graphical methods.

SUMMARY OF THE INVENTION

In accordance with preferred embodiments of the present invention, some of the problems associated managing files are overcome. A system and method for iconic software environment management is presented.

The system and method provide storing, navigating and accessing files within an operating system on a stand alone device or on a networked device with internal files or external files (e.g., from web-sites, etc.) through the use of a graphical thumbnail icon representing a graphical display of a substantial portion of information obtained from within an electronic document.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

The detailed description particularly refers to the accompanying figures in which:

FIG. 17 is a flow diagram illustrating a method for viewing contents of electronic files.

DETAILED DESCRIPTION OF THE INVENTION

Figure 1:
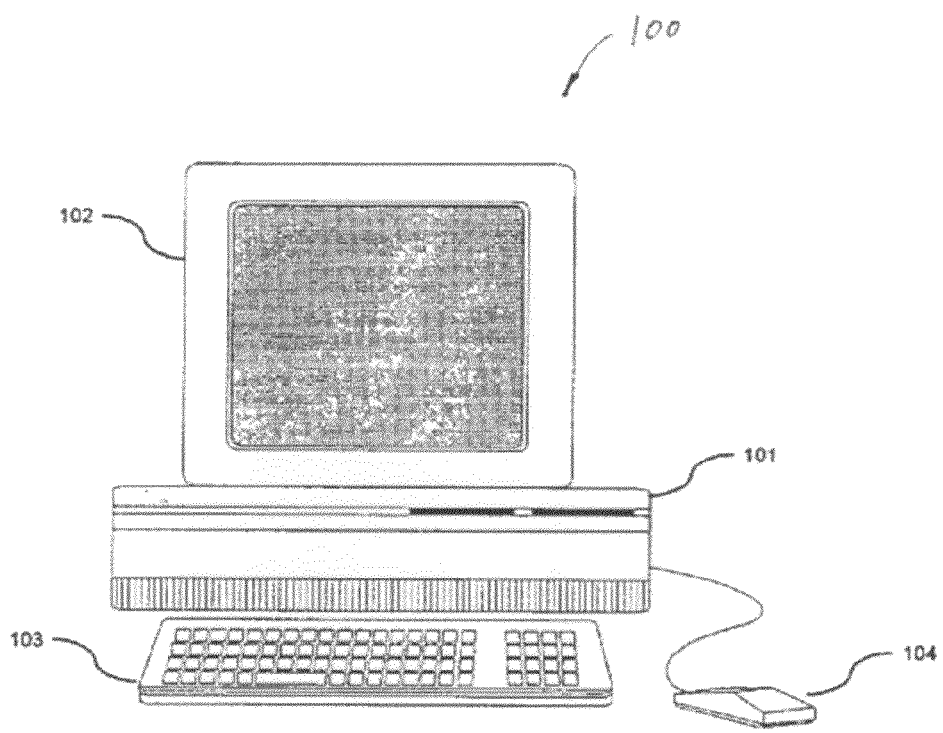
FIG. 1 is a pictorial representation of a data processing system which may be utilized to implement methods and systems of the present invention.

A brief explanation of "window", "handle", "parent window", and "child window" is necessary to understand the references to them throughout the discussion of the present invention. In the preferred embodiment, a "window" in its purest form is any graphical element that is displayed on the screen. A "handle" is an object identifier in memory, which can be associated with windows, files, and other elements in memory. A window without a "parent window" is a top level window, which is typically an application. An application typically has many "child windows" which make up the graphical interface consisting of buttons, scroll bars, icons, text boxes, etc. Child windows can have multiple child windows which can also have child windows, thereby constructing a structure of parent-child relationships between the various graphical elements of an application or top-level window.

It is understood that multiple applications can be opened or active simultaneously, but only one application can be in the "foreground" accepting input (keyboard, mouse, etc.)

instructions from the user at any given time, with any other applications currently open being in the "background". Likewise with MDI (multiple document interface) applications there can only be one document in the foreground accepting input (keyboard, mouse, etc.) instructions from the user at any given time and any other documents currently open within the application would be in the background. Document handles only exist with applications that support the MDI capability. Basically, MDI specifies whether or not an application can have multiple files open simultaneously to allow the user to switch between them during their editing process, and a non-MDI application would only support one file open at any give time.

The term "document" includes, but is not limited to, text files, graphic images, sound files, spreadsheets, databases, web pages with URL addresses, video clips, animations, compound documents which could include any the file formats mentioned, presentations, etc. and other types files stored in electronic format.

A computer system includes storage devices that would store the application and document files in directories and sub-directories, such as a hard drive or floppy drive. In the preferred embodiment, applications and the operating system are provided with an implementation-independent Application Programming Interface (API) that provides a set of functions that are invoked by client and server applications to act upon particular objects.

"Subclassing" refers to the process of intercepting Windows messages that are sent to and from the operating system and "windows" and forcing the operating system to call a function specified with the present invention before the operating systems calls the original function for that window. Windows messages are commands that are used by the operating system and the applications to communicate the need to perform specific functions. For example, the operating system will send a message to a window when the user has clicked on a button, in order to notify the application that it needs to perform the necessary functions associated with that button.

A "File System Hook" is a function of the operating system that allows applications to monitor all activity within the file system to determine what files have been opened, saved, read, written, or deleted. The File System Hook actually intercepts the functions calls made to the operating system by any application currently open. The File System Hook has access to the following pieces of information: the process/application that requested the file access, the filename and path of the file that is being accessed, what type of access is being performed (save, open, read, etc.), whether or not the access was completed successfully, and other miscellaneous information.

With reference now to the figures and in particular FIG. 1, a computer system 100 which may be utilized to implement the method and system of the present invention includes a processor 101 coupled to a display screen 102, a keyboard 103, and a graphical pointing device 104. Processor 101 includes memory and one or more storage devices such as a hard disk drive and a floppy disk drive (not shown). By way of example, computer system 100 is an IBM-PC compatible computer, or other type of computer or network device running the Microsoft Windows 95, 98, XP operating system and may or may not be connected to a local area network or other internetworking system. Graphical pointing device 104 may be implemented utilizing a mouse, light pen, touch sensitive screen, voice recognition hardware, or any other device suitable to control and operate the graphical user interface. A keyboard 103 "hot-key" typically consists of a combination of keystrokes that activate specific features or functions in applications. For example, pressing and holding down the "SHIFT" key and then pressing the function key "F1", and releasing both keys would be considered a "hot-key" combination.

Figure 2:
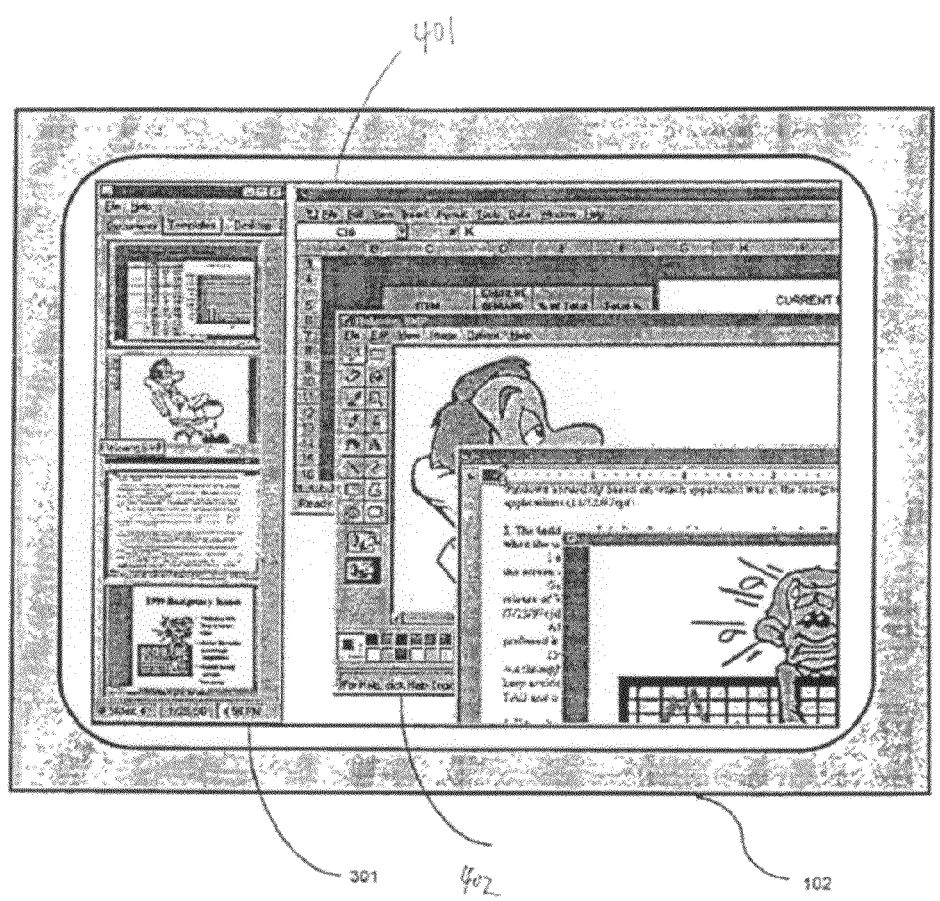
FIG. 2 is a pictorial representation of a computer display screen illustrating a method and system of the present invention.
Figure 3:
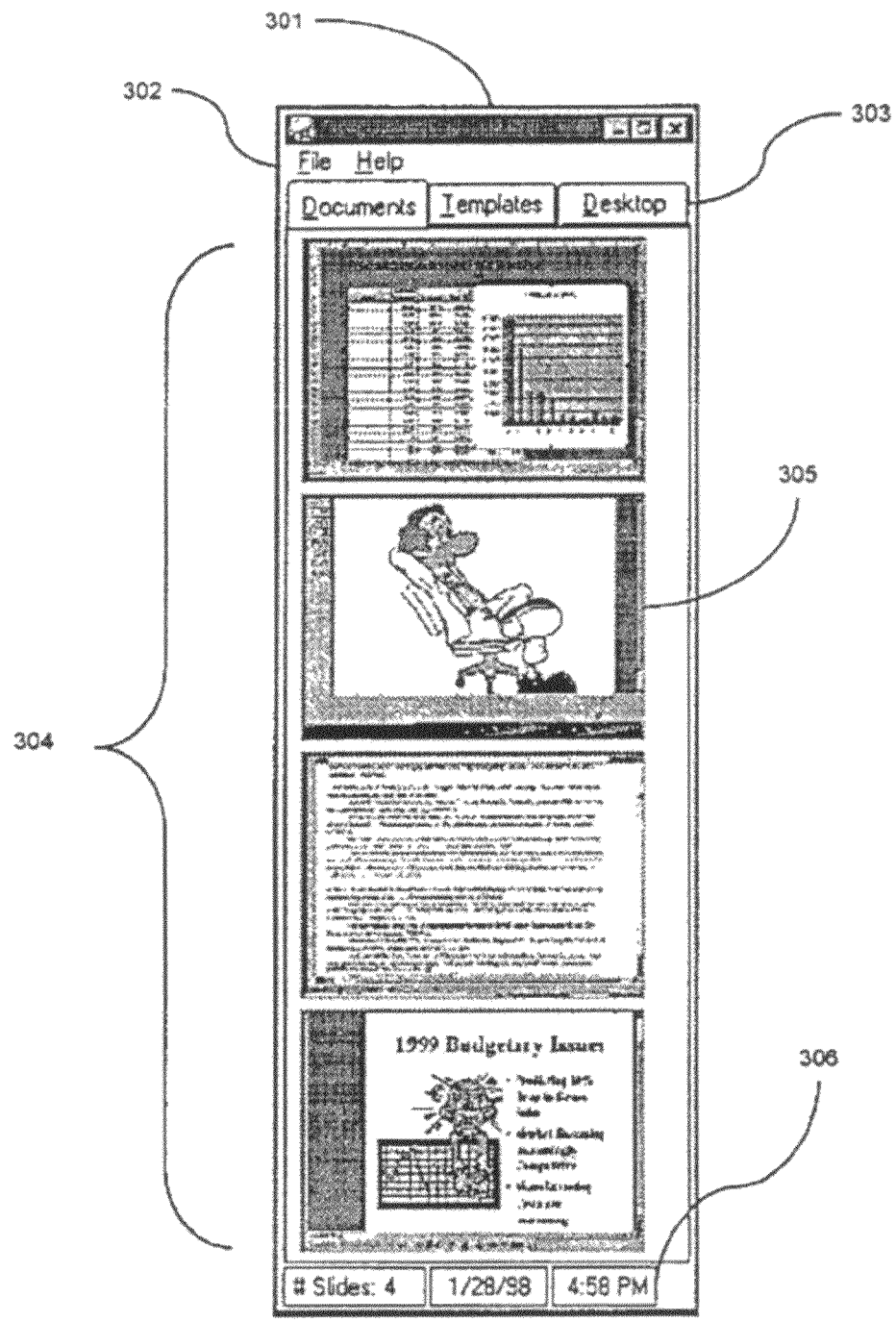
FIG. 3 is a pictorial representation of a graphical user interface for the methods and systems of the present invention.

FIG. 2 depicts computer display screen 102 displaying a Snapshot Navigator Menu 301 along with open applications, both MDI 401 and non-MDI 402 capable. Referring now to FIG. 3, Snapshot Navigator Menu 301 includes five basic elements: a menu bar 302, a tab strip 303, a File Snapshot List 304, individual File Snapshots 305, and a status bar 306. Snapshot Navigator Menu 301 is attached to the left or right edge of the screen and automatically appears when the mouse pointer is directed to the edge upon which the Snapshot Navigator Menu 301 resides. The Snapshot Navigator Menu 301 automatically disappears shortly after the mouse pointer moves away from the Snapshot Navigator Menu 301 and into other areas of the screen.

File Snapshot 305 includes a miniaturized graphical depiction of the screen at the time the document and/or application is open and was "captured", using a screen capture of the active window, into a graphical icon and placed onto Snapshot Navigator Menu 301. Alternatively, File Snapshot 305 can be generated by constructing a graphical depiction based on the contents of the document without actually creating a screen display. File Snapshot List 304 is a group of File Snapshots 305 that are saved/stored to the mass storage device with a filename that is typically representative to the collective content of the File Snapshots 305. An illustrative File Snapshot List 304 would be a group of File Snapshots 305 that would all pertain to a specific topic. An example of such a list would be text documents consisting of memos, letter, notes etc., as well as spreadsheet files, graphic files of mechanical drawings, etc. that collectively would be necessary for a person in management to prepare a budget for a department within a corporation.

An illustrative File Snapshot 305 includes the following information: graphical icon thumbnail image of the document at the point of capture, the document filename, the file object identifier, document handle (if applicable), the application filename, the application handle, and the application's MDI capabilities. The graphic thumbnail image illustratively is a screen capture of the document as displayed during manipulation by the application that has been scaled down to fit into one of the File Snapshot 305 positions on the Snapshot Navigator Menu 301. Tab strip 303 is used to switch between File Snapshots 305 and Template Snapshots (not shown) and Desktop Icons (not shown).

Template Snapshots are a miniaturized graphical depiction of the screen at the time the document was converted into a "template", as well as the application filename and document filename. As discussed in more detail below, the "template" is a duplicated copy of a File Snapshot 305 that allows users to open pre-formatted files within applications that may or may not inherently support a template format for its files.

Desktop Icons are graphical icons that are positioned onto the initial screen of the preferred embodiment and are easily accessible when applications are either not open or have been "minimized". Minimized is a state when the application has been reduced to a small icon and is longer being displayed onto the main screen. The Desktop Icons feature allows Snapshot Navigator Menu 301 to display all of these icons at any time, whether applications are open and being displayed on the screen or not, making them easily accessible to the user.

Status bar 306 is used to display the current date and time as well as the number of File Snapshots 305 or Template Snapshots currently open and to display any other desired information during operation. Menu bar 302 is used to access the commands available for opening, saving, and printing of File Snapshot Lists 304, as well as exiting the program and accessing on-line help, configuration settings and other advanced features. The process of "capturing", as described in more detail below, includes recording a graphical representation of the document as well as the document and application filenames, including the entire directory path, and placing the image representative of this information onto the Snapshot Navigator Menu 301. The process of "retrieving", as described in more detail below, includes opening the application and document from their respective locations on the mass storage device, unless either the application or document is currently active (open in memory). If an application or document is already active, "focus" is switched to that application and document. Focus indicates which window currently is receiving mouse and keyboard events.

Figure 4:
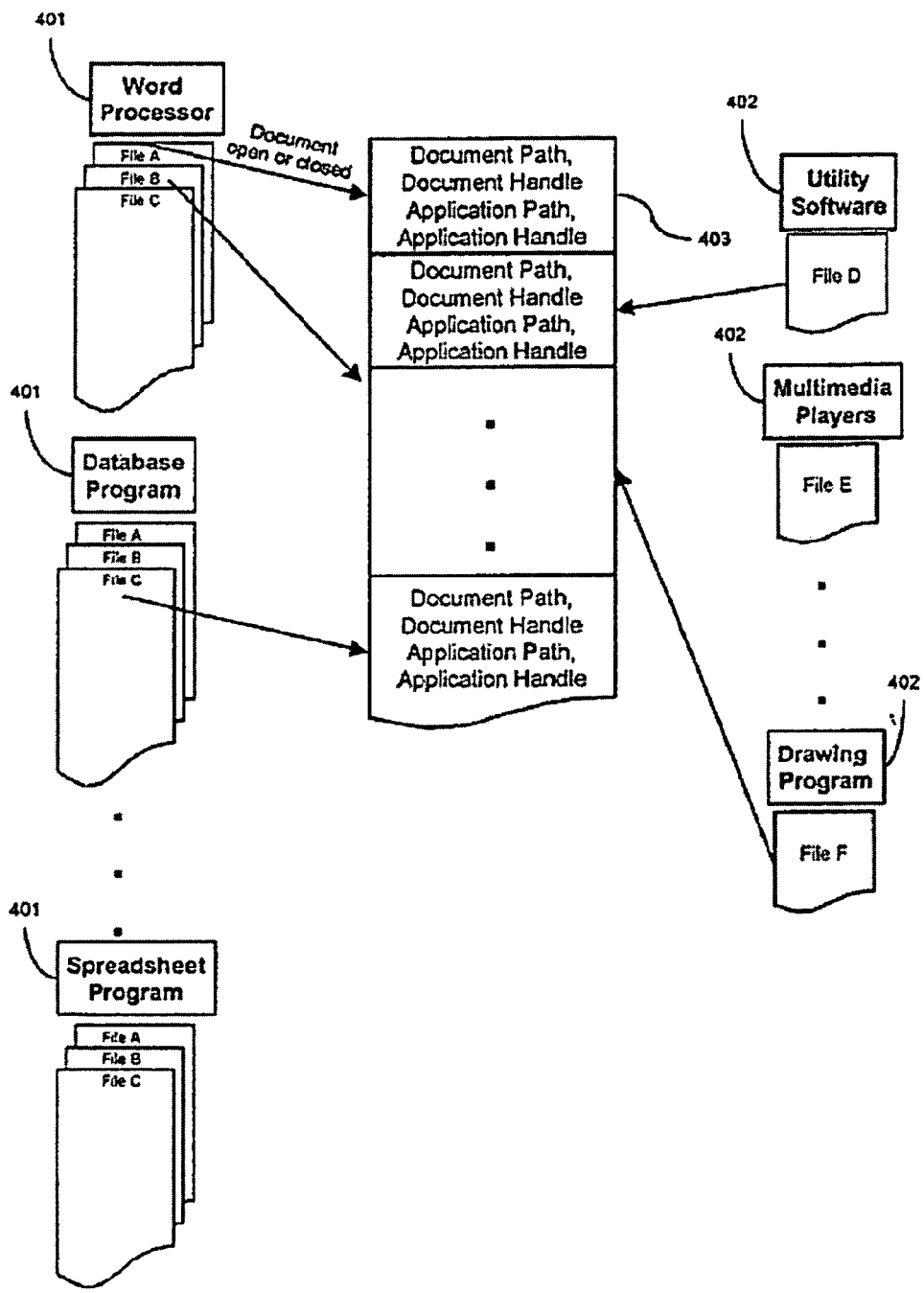
FIG. 4 is a pictorial representation of a file access tracking log and its interaction with two basic types of applications, MDI and non-MDI.

Referring now to FIG. 4, there is depicted a pictorial representation of the File Access Tracking Module's "log" that is dynamically modified to contain the information about all documents that are currently open and the applications that they reside in. MDI-capable applications 401 illustrate how each application is listed with each file entered into the log. Non-MDI-capable applications 402 illustrate how there exists only one entry for each application that has one file open within it. Log file 403 maintains the application filename, application handle, document filename, and document handle (if applicable) provided for each application and file.

Figure 5:
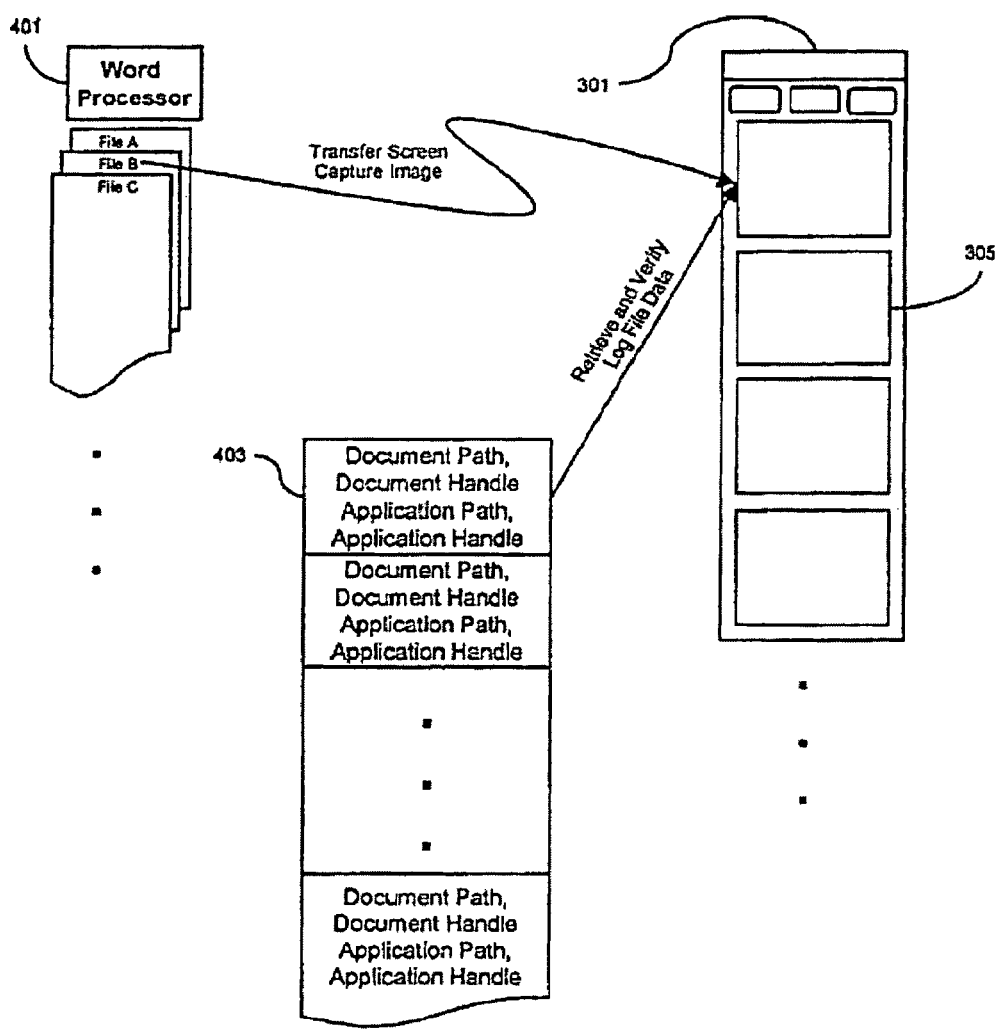
FIG. 5 is a pictorial representation of a document capture sequence illustrating the interaction with an application and file, a log file, and a user interface to the present invention.

Referring now to FIG. 5, there is depicted a pictorial representation of the document capture sequence. This sequence is initiated by the user pressing a keyboard capture hot-key while working within an application 401, 402. A screen capture of the document with the application is transferred to the File Snapshot 305 of Snapshot Navigator Menu 301, as well as the corresponding path and handle information from the File Access Tracking Module log file 403.

Figure 6:
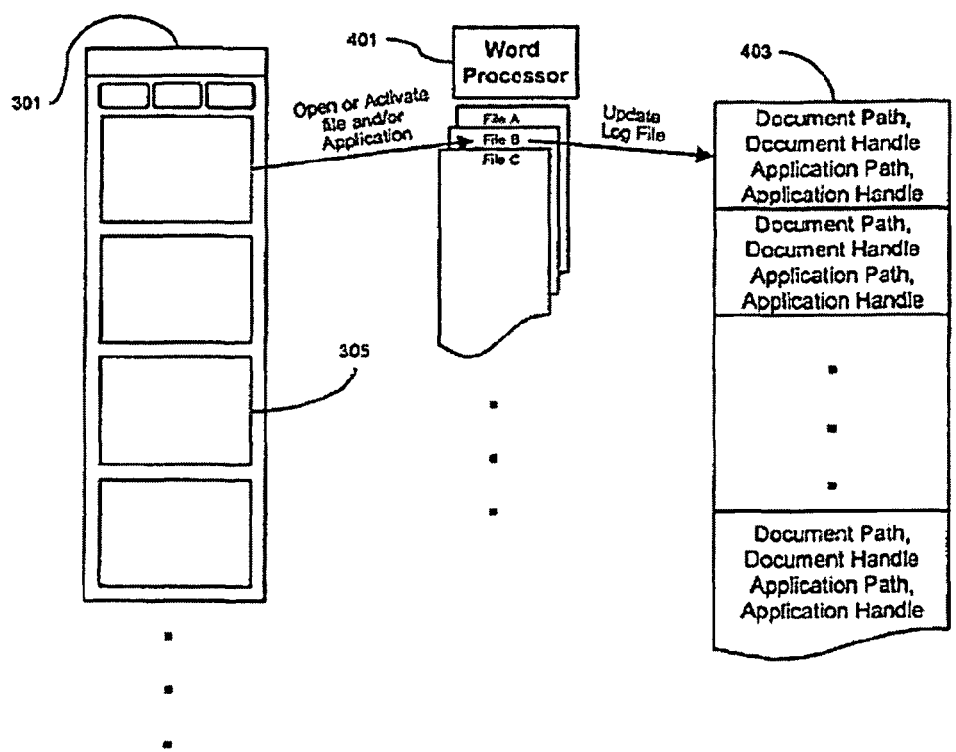
FIG. 6 is a pictorial representation of a document retrieve sequence illustrating the interaction with a user interface according to the present invention, an application and file, and a log file.

Referring now to FIG. 6, there is depicted a pictorial representation of the document retrieve sequence. This sequence is initiated by the user clicking on one of the File Snapshots 305 of Snapshot Navigator Menu 301. The application 401 and/or the document is either opened or simply activated and brought to the foreground and then the application filename, application handle, document filename and document handle (if applicable) are transferred to the File Access Tracking Module where the log file 403 is updated.

Figure 12:
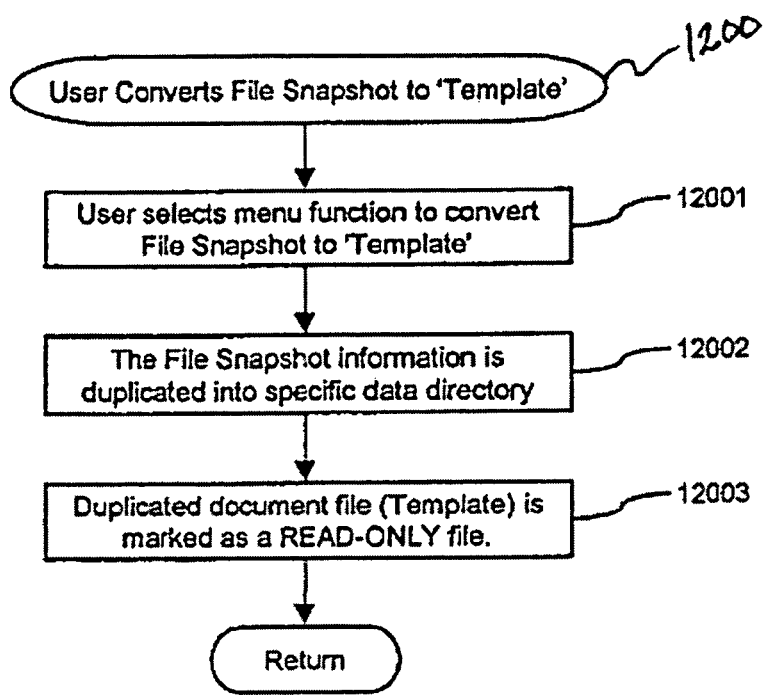
FIG. 12 is a flow diagram of a document to template conversion process.
Figure 13:
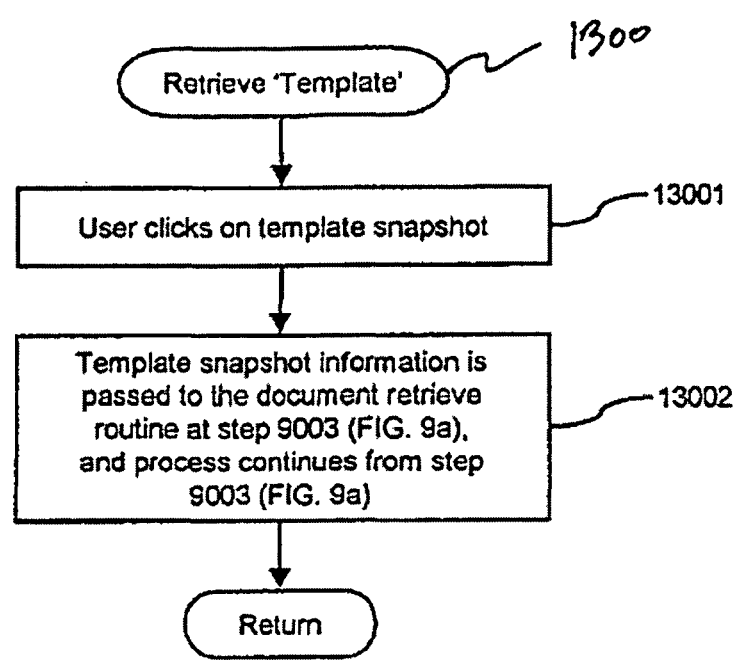
FIG. 13 is a flow diagram of a template retrieve routine.

FIGS. 7-11 illustrate the process of capturing and retrieving files from their original locations and their respective editing applications onto and from, respectively, Snapshot Navigator Menu 301. FIGS. 12 and 13 illustrate the process of converting documents to "templates" and retrieving "templates", respectively.

Figure 7:
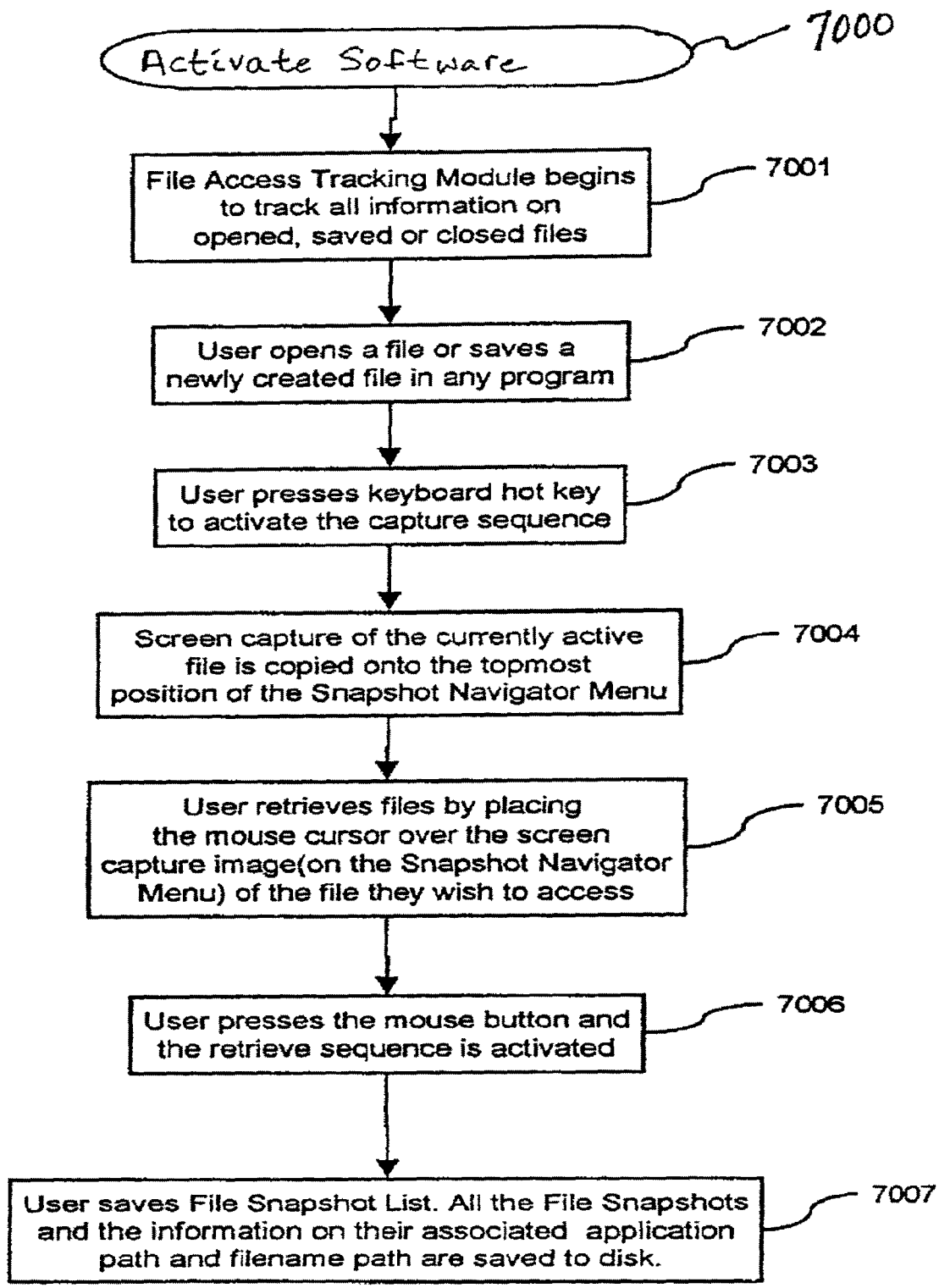
FIG. 7 is a flow diagram of the basic operation of software according to the present invention.

In general, as illustrated in FIG. 7, the user begins by launching the software as described in the present invention in step 7000. In step 7001 the File Access Tracking Module begins to track each file as it is opened and the respective application that opened the file as well as the window handle for the application and the document, if the document is opened within an application supporting standard MDI features. Tracking of file openings by the File Access Tracking Module is discussed in more detail below in reference to FIG. 10. Next, in step 7002, the user proceeds to open a file or saves a newly created file to a storage device. Next in step 7003, at any time during the process of editing and/or viewing the file within the application they have opened, the user presses a keyboard hotkey to activate the capture sequence. The capture sequence is discussed in detail below in reference to FIGS. 8*a-c*.

In step 7004, the screen capture of the currently active file and its application are copied onto the topmost position of the Snapshot Navigator Menu 301 along with the corresponding application directory path and file path. Next in step 7005, the user places the mouse over the graphical representation of the file being manipulated and in step 7006, the user clicks the mouse button and the retrieve sequence is activated.

The retrieve sequence is discussed in detail below in reference to FIGS. 9*a-f* Next, in step 7007, when the user has "captured" the documents and would like to store this listing to a storage device, the listing is stored with each document filename, application filename and the graphic thumbnail image.

Figure 8A:
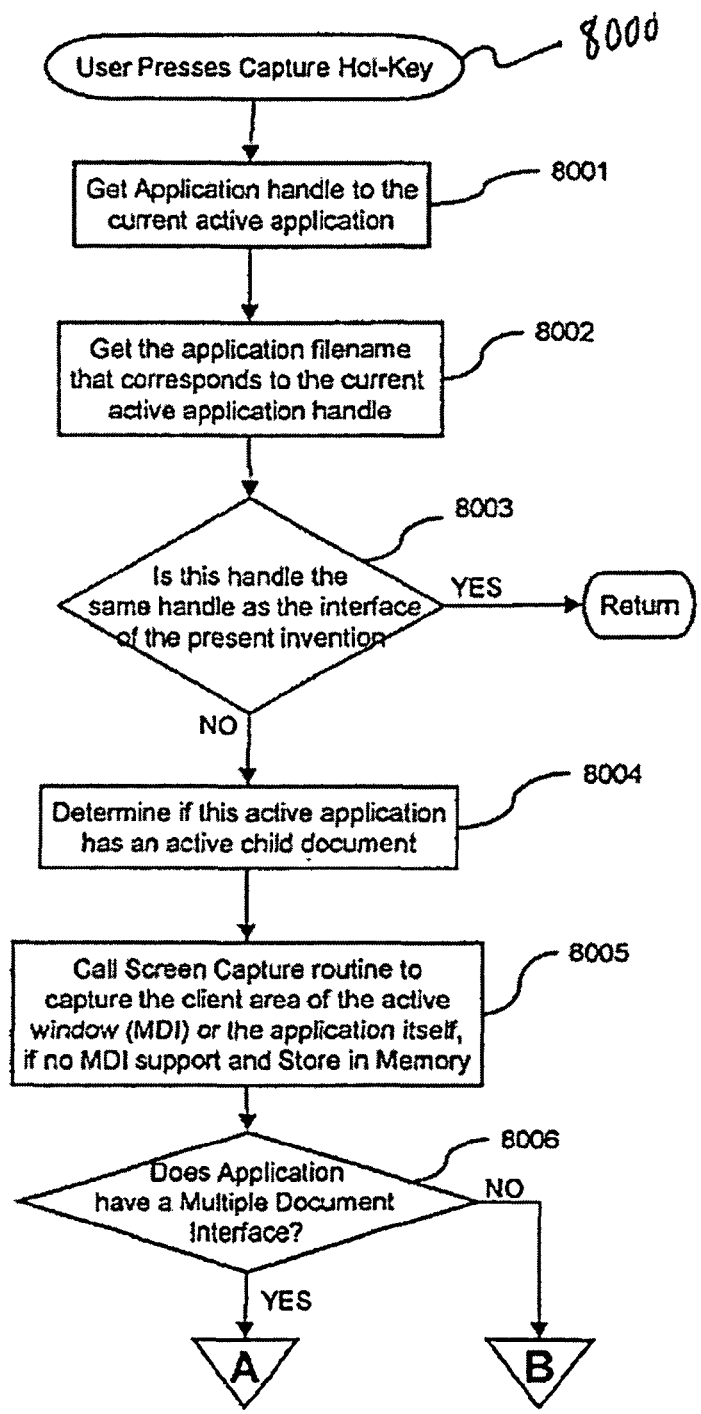
FIGS. 8a-c are a flow diagram of a capture routine.
Figure 8B:
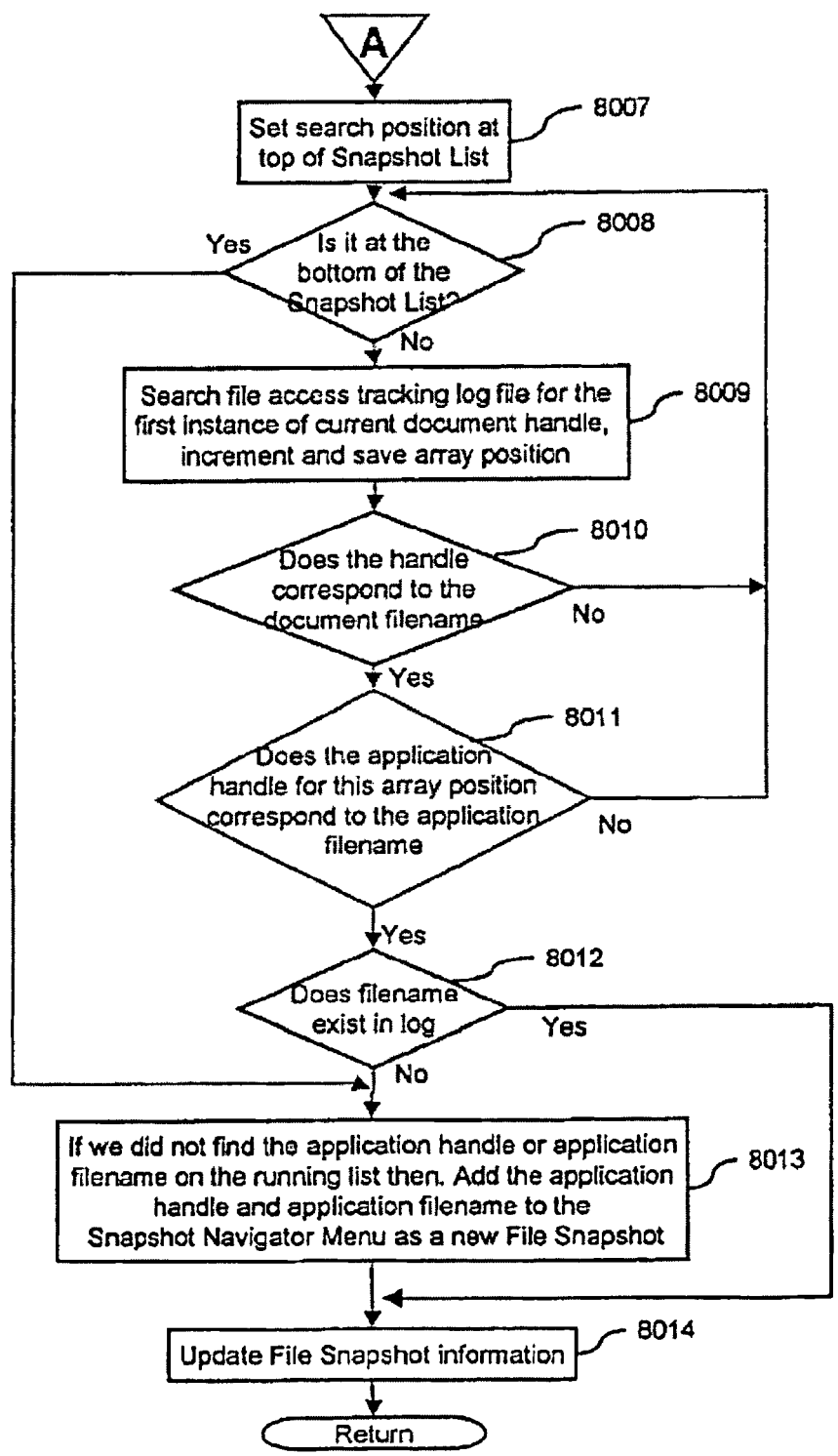
Figure 8C:
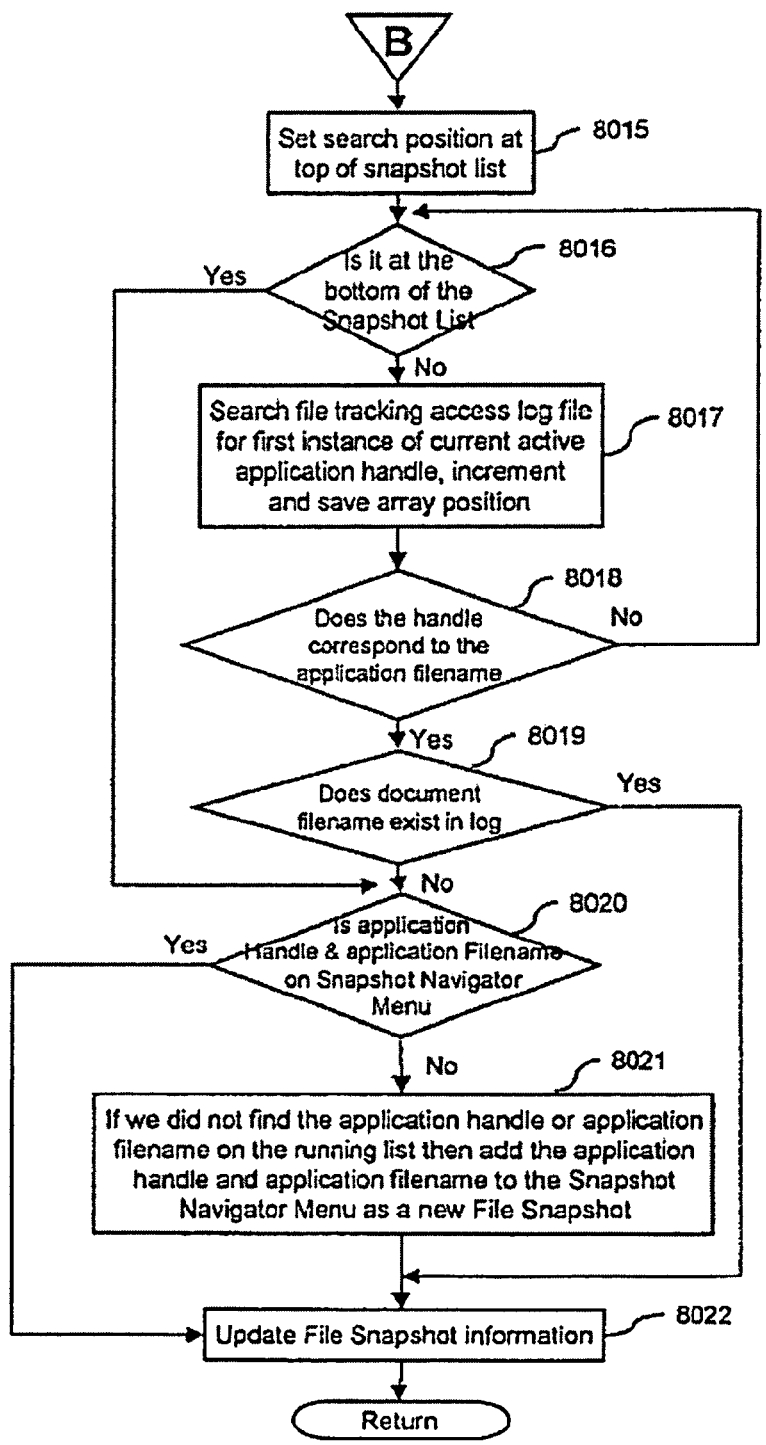

FIGS. 8*a-c* are detailed flow diagrams of the capture process that is activated when the user presses the capture hotkey in step 8000. FIG. 5 shows a functional diagram of the capture process. In this routine the screen capture 305 and information from the log file 403 are verified and transferred to the Snapshot Navigator Menu 301. In step 8001, by intercepting the hotkey keystroke throughout the entire operating system the active application can be determined by an API function call. Another API function call is used to determine the application window handle (the object identifier in memory used to identify the graphical window of the application) of the application that is currently active. In step 8002, an API function call is used to determine the filename and path of the active application. In step 8003, the application handle is compared to the application handle of the software, that is the present invention, and if the handles are identical this capture is discarded and system control is returned to the user; otherwise the process continues. In step 8004, the application handle is interrogated to determine what, if any, child window handles exists and if any of those handles have characteristics that correspond to the criteria for an MDI interface. In step 8005; an API function call is made to perform a screen capture of the contents of a specified window handle. If a child window handle meets the specified criteria for an MDI then a screen capture function is performed on that child window and stored in memory, otherwise the screen capture function is performed on the entire application window and stored in memory. In step 8006, the characteristics of the application window are analyzed to determine if the application supports MDI, in which case the process continues to step 8007. If the application is non-MDI compliant then the process continues to step 8015.

In step 8007, a search pointer is positioned at the top of a list of files that have been logged by the File Access Tracking Module to begin searching through the most recently logged files and applications. In step 8008, the search pointer is checked to see if it is at the bottom of the list, in which case control transfers to step 8013. If the search pointer is not at the bottom of the list, then in step 8009 the document handle from the log file 403 is retrieved for the instance of the current document handle obtained in 8004. This information is saved, the pointer is incremented and stored, and control then proceeds to step 8010. In step 8010, the document handle captured from step 8004 is compared to the retrieved document handle, and if they match then control proceeds to step 8011. If the document handles do not match then control returns to step 8008 to examine the next position in the list. In step 8011, the application handle in the list is compared to the application handle captured from step 8001 and if they match control proceeds to step 8012. If the application handles do not match then control returns to step 8008 to examine next position in the list.

In step 8012, the document filename is checked to see if it exists in the File Access Tracking Module's log file 403, and if so control proceeds to step 8014. If the document filename does not exist in the log then control proceeds to step 8013. In step 8013, if the current application handle or application filename could not be found in the log, then the application handle and application filename get added to the Snapshot Navigator Menu 301 with a "blank" filename (blank actually consists of a filename "*No Filename Associated*"), and then control proceeds to step 8014. In step 8014, the File Snapshot List 304 is updated with this newly acquired information for the application handle, application filename, and document filename, document handle, where applicable, and then processing is return to the user.

In step 8015, the search pointer is positioned at the top of the list of files that have been logged by the File Access Tracking Module to begin searching through the most recently logged files and applications. In step 8016, the search pointer is checked to see if it is at the bottom of the list. If it is then control transfers to step 8020, and otherwise it continues to step 8017. In step 8017, the document handle from the log file 403 for the instance of the current document handle obtained in 8004 is retrieved. This information is saved, the pointer is incremented and stored, and control then proceeds to step 8018. In step 8018, the captured application handle from step 8001 is compared to the application handle in the list at this position. If the application handles match then a check is made to determine if the captured application filename from step 8002 matches the application filename in the list. If the filenames match then control proceeds to step 8019, otherwise control returns to step 8016.

In step 8019, the filename of the document is checked to see if it exists in the File Access Tracking Module log file 403. If it does then control transfers to step 8022, otherwise control proceeds to step 8020. In step 8020, the application handle and application filename are compared with all the File Snapshots 305 on the Snapshot Navigator Menu 301 to see if it has already been captured. If it has been captured then the document filename information is retrieved from the Snapshot Navigator Menu 301 and control transfers to step 8022, otherwise control proceeds to step 8021. In step 8021, if the current application handle or application filename could not be found in the log, then the application handle and application filename are added to the Snapshot Navigator Menu 301 with a "blank" filename (blank actually consists of a filename "*No Filename Associated*"), and control proceeds to step 8022. In step 8022, the File Snapshot List 304 is updated with this newly acquired information for the application handle, application filename, and document filename, where applicable, and then processing is returned to the user.

FIGS. 9*a-f* provide a detailed flow diagram of the retrieve process that is activated from the user clicking on one of the File Snapshots 305. FIG. 6 shows a functional diagram of the retrieve process. In the retrieve process, information from the File Snapshots 305 is retrieved. After verifying the accuracy of the information, the file and/or application 401 is opened or made active and the updated information is stored in the log file 403. Many variables must be evaluated throughout the process of retrieving documents in order to eliminate the possibility of an attempt to open a document a second time if it is already open, to eliminate the possibility of opening multiple copies of the same application, as well as to determine when to open a file from a mass storage device or when to simply make that document active if it is already open.

Figure 9A:
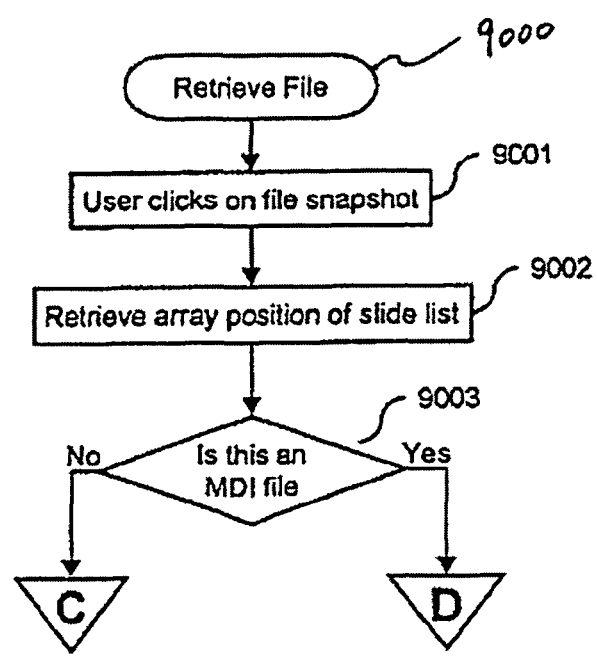
FIGS. 9a-f are a flow diagram of a retrieve routine.

Referring to FIG. 9*a*, the retrieve process is activated in step 9000 when a thumbnail or individual File Snapshot 305 is selected from Snapshot Navigator Menu 301. In step 9001, the user clicks on one of the File Snapshots 305. In step 9002, a pointer position for this File Snapshot 305's information is retrieved. In step 9003, the File Snapshot 305 information is evaluated and if the file is from an MDI-capable application then control proceeds to step 9014, otherwise it proceeds to step 9004.

Figure 9B:
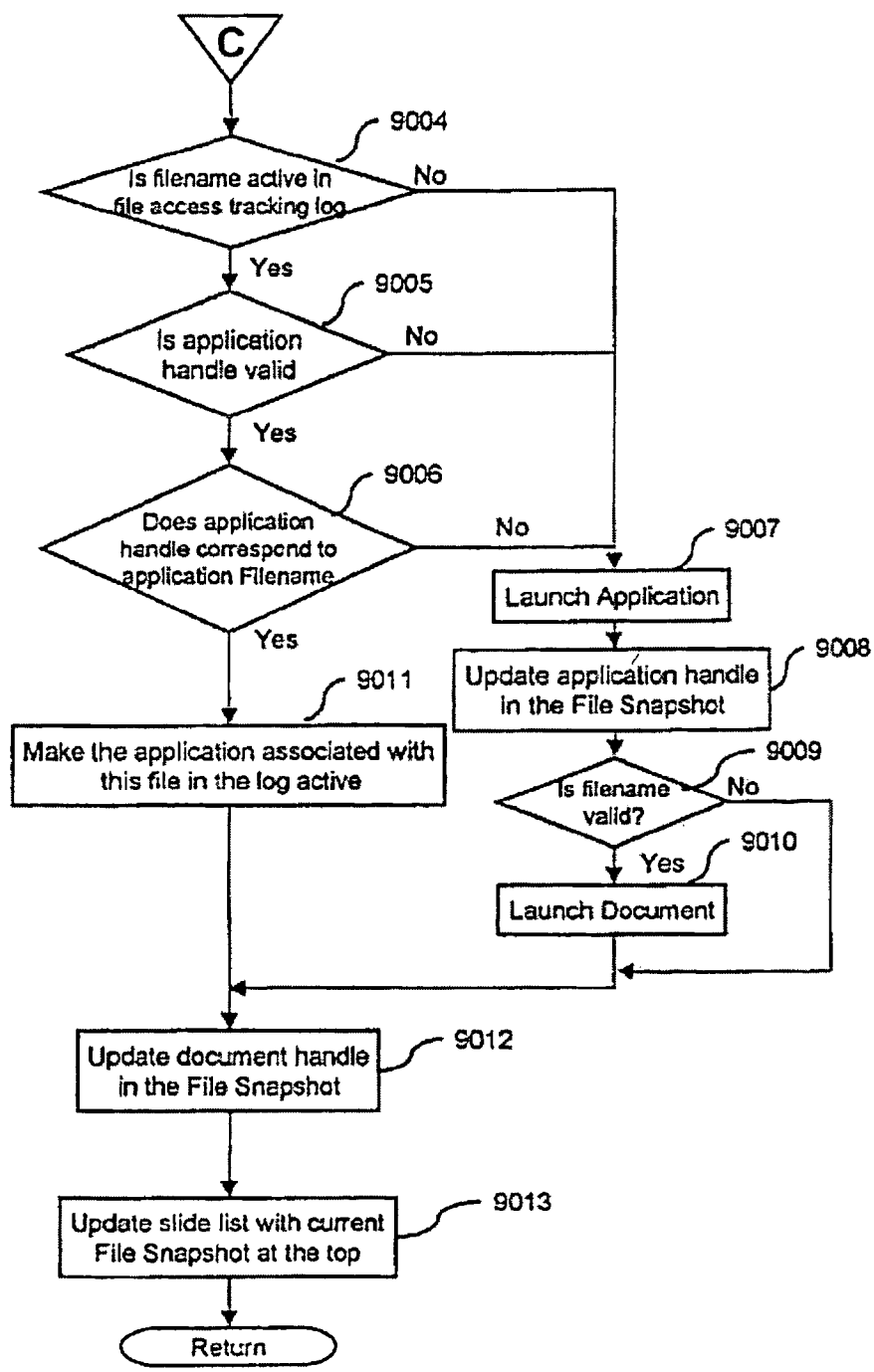

Referring now to FIG. 9*b*, in step 9004 the filename for the document is compared to information from the File Access Tracking Module log file 403 to see if the file is currently open. If the file is currently open then control proceeds to step 9005, otherwise it proceeds to step 9007. In step 9005, the application handle is checked to see if it is still valid in memory, in which case control proceeds to step 9006, and otherwise it transfers to step 9007.

In step 9006, the application handle is evaluated to determine if the application that owns the application handle corresponds to the application filename that is stored in the File Snapshot 305 that is being activated. If they correspond then control transfers to step 9011, otherwise it proceeds to step 9007. In step 9007, the application filename stored in the File Snapshot 305 is launched. In step 9008, the application handle is retrieved from the operating system and the application information for this File Snapshot 305 is updated. In step 9009, the filename is evaluated to see if it is a valid filename and if it exists on the designated mass storage device, in which case control proceeds to step 9010, otherwise it transfers to step 9012. In step 9010, the document is launched within the application and the document handle is retrieved from the operating system.

In step 9011, the application that is associated with the File Snapshot 305 that the user activated is brought to the foreground and made active. In step 9012, the document handle for this File Snapshot 305 is updated. In step 9013, the Snapshot Navigator Menu 301 information is updated and the File Snapshot 305 that was activated is moved to the topmost position and all the other File Snapshots 305 are moved down one position in the File Snapshot list 304, and processing is returned to the user.

Figure 9C:
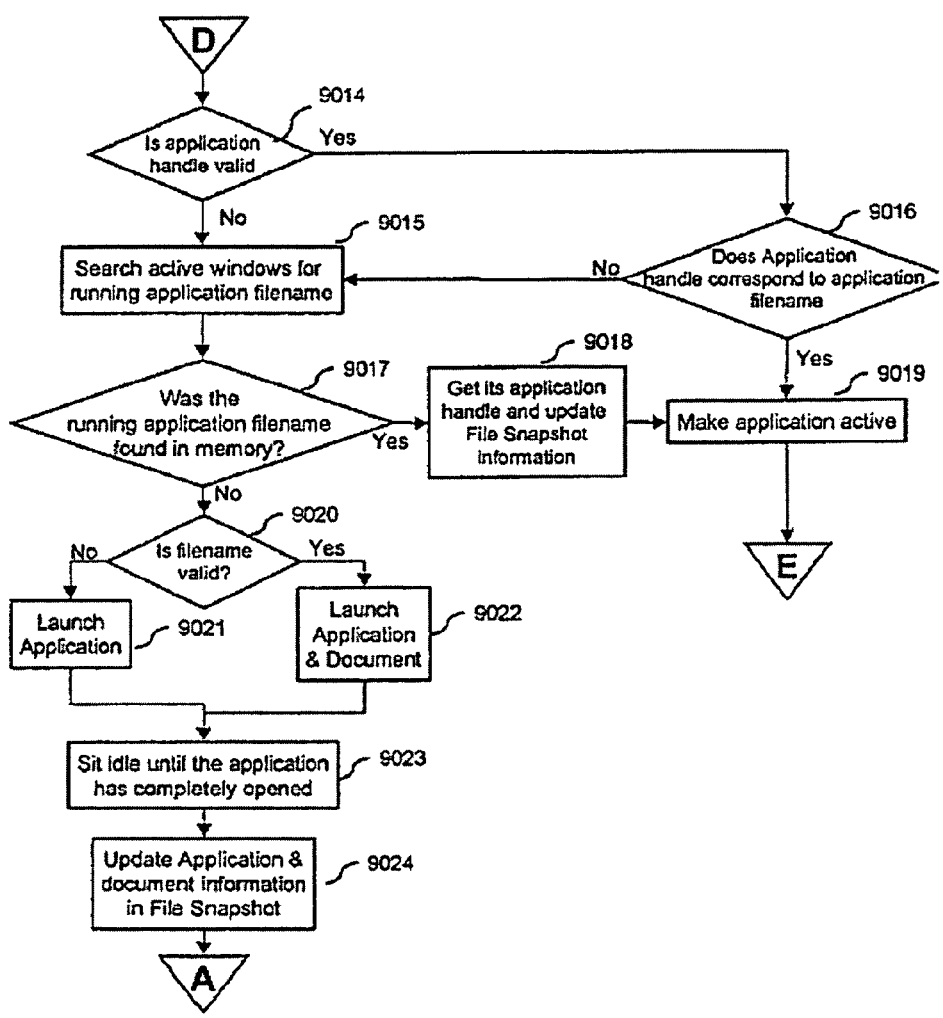

Referring now to FIG. 9*c*, in step 9014 the application handle is evaluated to determine if it is still valid in memory. If it is then control transfers to step 9016, otherwise proceeds to step 9015. In step 9015, the operating system is queried to return the filename for every application currently open, and each open application filename is checked to see if it matches the handle of the application that is being launched. Control then proceeds to step 9017, in which the application filename that is being launched is checked to see if it was found open in memory. If so, then control proceeds to step 9018, otherwise it transfers to step 9020.

In step 9018, the application handle for the application filename that was found is retrieved from the operating system and the application filename and application handle for the File Snapshot 305 is updated. In step 9019, the application is brought to the foreground and made active and control proceeds to step 9025.

In step 9016, the application handle is compared to the application filename to see if they correspond. If the application handle and filename correspond then control transfers to step 9019, otherwise it proceeds to step 9015. In step 9020, the document filename is evaluated to see if it is valid and exists on the mass storage device. If so, then control proceeds to step 9022, otherwise it proceeds to step 9021. In step 9021, only the application is launched and control proceeds to step 9023. In step 9022, the application and document are both launched and then control proceeds to step 9023.

In step 9023, processing pauses until the application is opened completely. The operating system is then queried to return application handle, and control proceeds to step 9024. In step 9024, the information for the File Snapshot 305 is updated with the new application handle and document handle. Control then proceeds to step 9038.

Figure 9D:
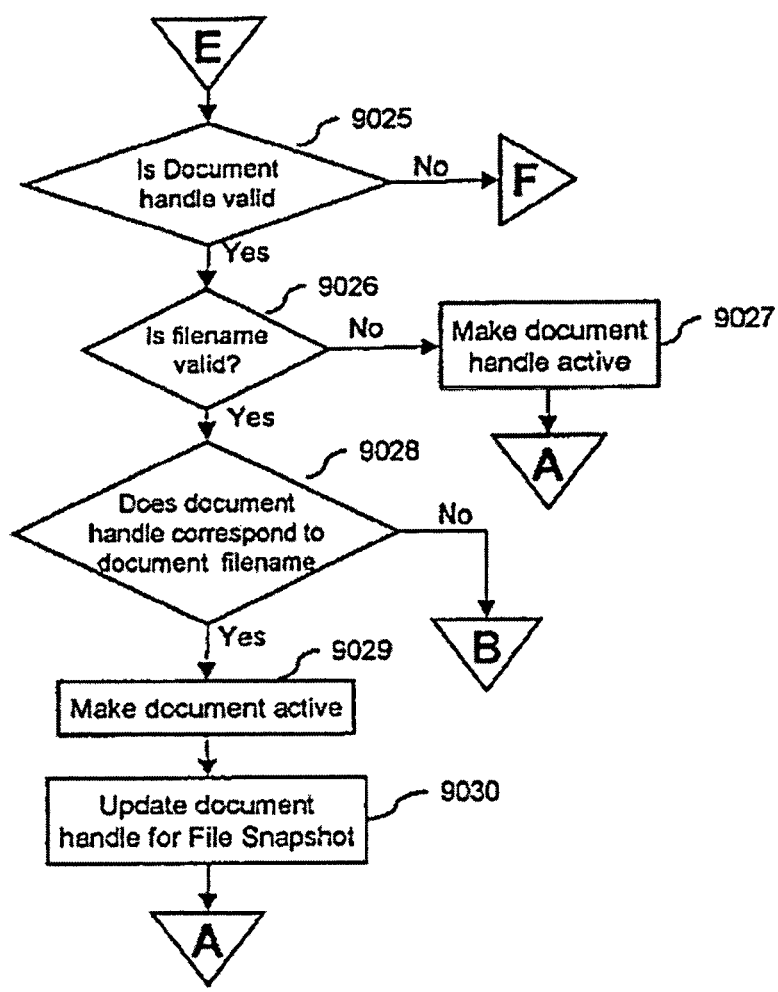

Referring now to FIG. 9d, in step 9025 the document handle is evaluated to see if it is valid in memory. If it is then control proceeds to step 9026, otherwise control proceeds to step 9031. In step 9026, the filename is evaluated to see if it is valid and exists on the mass storage device. If it is then control proceeds to step 9028, otherwise control proceeds to step 9027. In step 9028, the document handle is compared to the document filename to see if they correspond. If they do then control proceeds to step 9029, otherwise it proceeds to step 9037. In step 9029, the document within the application is brought to the foreground and made active, and control then proceeds to step 9030. In step 9030, the document handle information for the File Snapshot 305 is updated and then control proceeds to step 9038. In step 9027, the document is brought to the foreground and made active, and control then proceeds to step 9038.

Figure 9E:
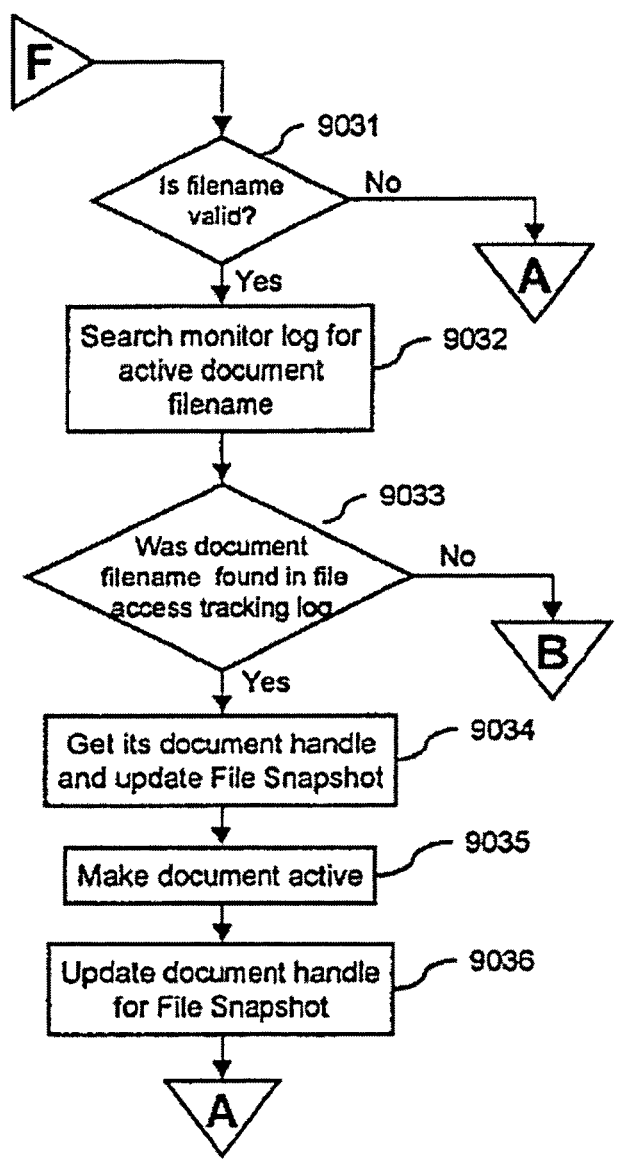

Referring now to FIG. 9e, in step 9031 the document filename is evaluated to see if it is valid and exists on the mass storage device. If both conditions are true then control proceeds to step 9032, otherwise it transfers to step 9038. In step 9032, the File Access Tracking Module log file 403 is searched to find the document filename that is being activated. Next, in step 9033, if the document was found in the File Access Tracking Module log file 403 then control proceeds to step 9034, otherwise control transfers to step 9037. In step 9034, the document handle is retrieved from the File Access Tracking Module log file 403. Next, in step 9035, the document is brought to the foreground and made active within the application and then control proceeds to step 9036. In step 9036, the document handle information for the File Snapshot 305 is updated and control then proceeds to step 9038.

Figure 9F:
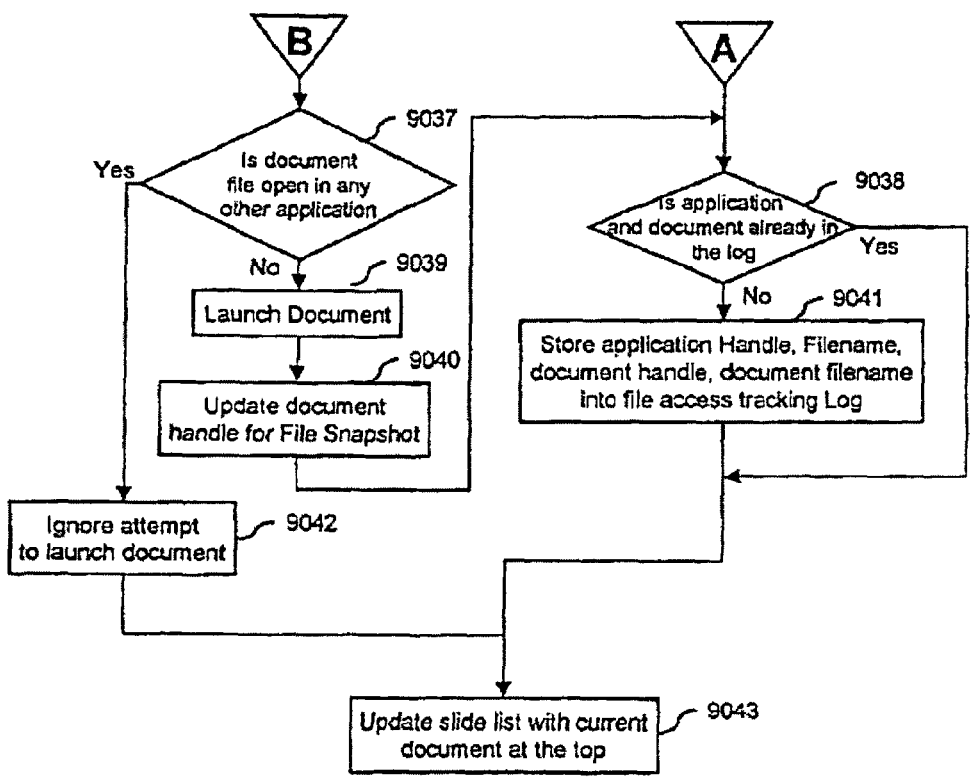

Referring now to FIG. 9f, in step 9037 the document file is checked to see if it is already open in another application. If it is, then control transfers to step 9042, otherwise control proceeds to step 9039. In step 9039, the document file is launched within the application. Next in step 9040, the document handle for the File Snapshot 305 is updated with this information. Alternatively, in step 9042, error checking is performed to qualify the information for this File Snapshot 305 which has been determined in step 9037 to be faulty, and the attempt to launch the file is ignored.

In step 9038, the application handle, application filename, document handle and document filename are checked to see if they exist in the File Access Tracking Module log file 403. If they do then control transfers to step 9043, otherwise it proceeds to 9041. In step 9041, the application handle, application filename, document handle and document filename are stored back into the File Access Tracking Module log file 403. Finally, in step 9043 the Snapshot Navigator Menu 301 information is updated and the File Snapshot 305 that was activated is moved to the topmost position and all the other File Snapshots 305 are moved down one position in the File Snapshot list 304. Processing is then returned to the user.

Figure 10:
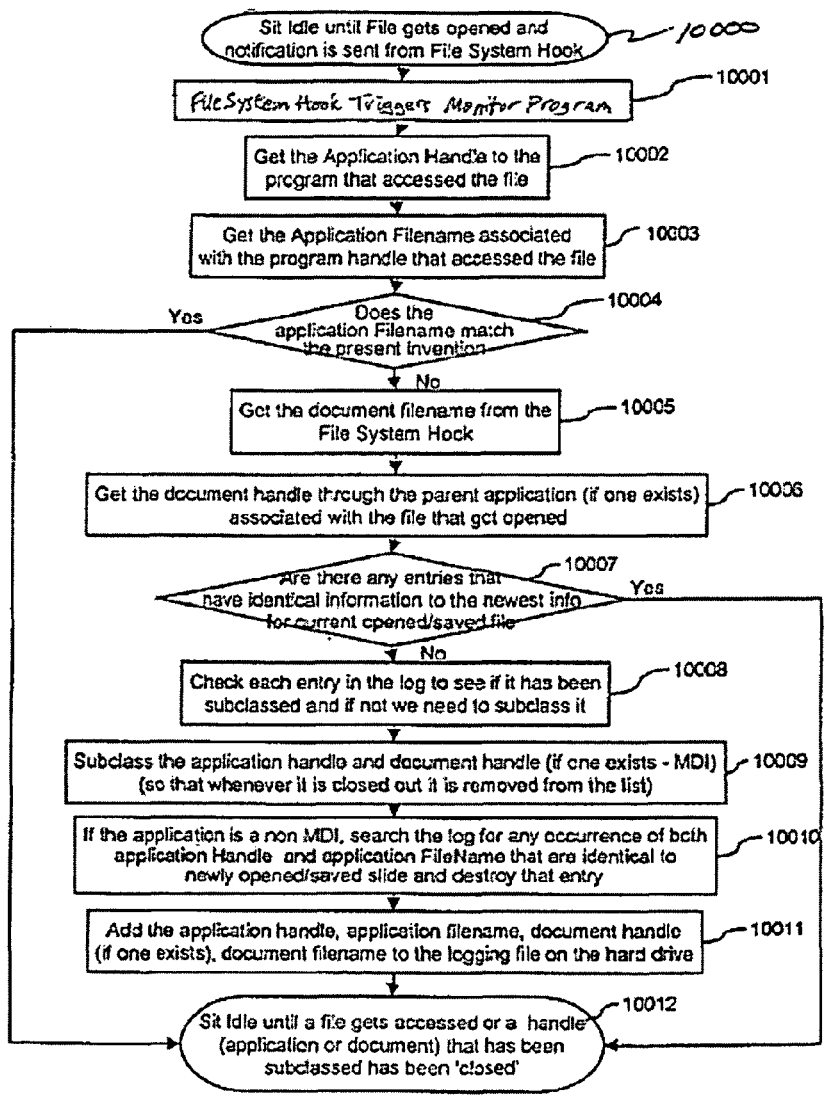
FIG. 10 is a flow diagram of a file access tracking module for tracking opening and saving of documents.

FIG. 10 is a detailed flow diagram of a monitor function of the File Access Tracking Module that logs the files and applications during the opening of existing files and/or the creation of new files. In step 10000, the File Access Tracking Module sits idle, operating as a background task, until it receives a notification from the file system hook of the operating system that a file has been opened or saved and then proceeds to step 10001. The file system hook intercepts all function calls to the operating system from applications that are requesting to open, save, read, write, or delete files, and passes that information to the File Access Tracking Module. In step 10001, the monitor function is notified by the file system hook of a file access. Next, in step 10002, the operating system is queried to determine which application is the current foreground application and the handle for that application is returned from the operating system. In step 10003, the application handle is then evaluated to determine the application filename. Next, in step 10004, the application filename is compared to the filename of the present invention. If they match then control transfers to step 10012, otherwise it continues to step 10005.

In step 10005, the document filename that triggered the notification is retrieved from the file system hook. In step 10006, the active application is then evaluated to determine the document handle, if one exists, for the file that triggered the notification. Next, in step 10007, the recently acquired application handle, application filename, document filename and document handle (if applicable) are compared to the entries in the File Access Tracking Module's log file 403 to see if there are any existing entries that contain this information. If a match for the recently accessed file match an entry in log file 403 then control transfers to step 10012, otherwise it continues to step 10008.

In step 10008, each entry in the File Access Tracking Module log file 403 is checked to see if the application and document handles have not yet been subclassed. If any entries have not been subclassed then they get subclassed, otherwise control proceeds directly to step 10009. In step 10009, the handles for the recently acquired application and document (where applicable) are subclassed. In step 10010, the application is evaluated to determine if it is an MDI-capable application. If it is a non-MDI-capable application then the File Access Tracking Module log file 403 is checked for any previous occurrence of both the application handle and application filename that match the recently acquired application filename and application handle. If such a previous occurrence is found, that specific entry is removed from log file 403. Next, in step 10011, the recently acquired application handle, application filename, document filename and document handle (if applicable) are added to log file 403. In step 10012, the File Access Tracking Module returns processing to the operating system and remains as a background task until triggered by another file system hook notification.

Figure 11:
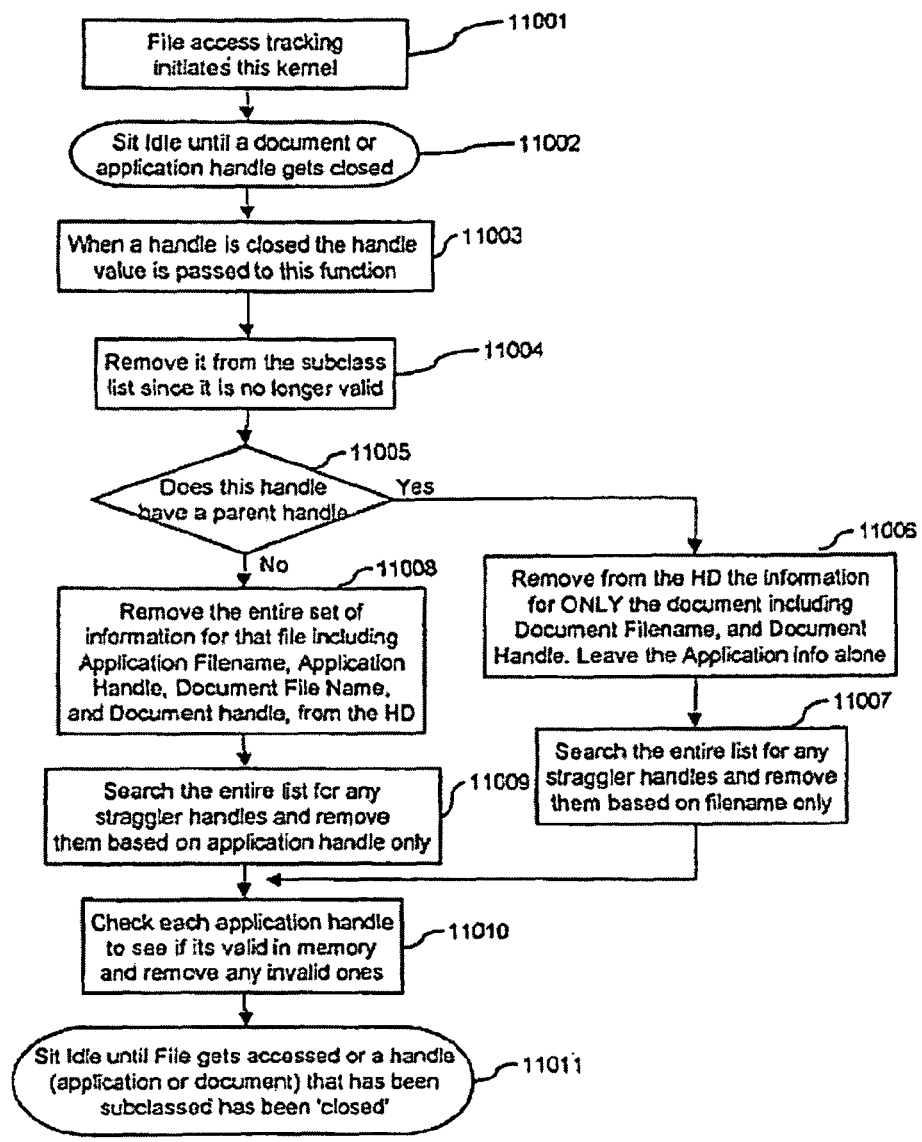
FIG. 11 is a flow diagram of a file access tracking module for tracking closing of application and documents.

FIG. 11 is a detailed flow diagram of another monitor function of the File Access Tracking Module that updates the log file 403 whenever a subclassed application is closed and/or document handle is closed. In step 11001, the File Access Tracking Module initiates a kernel which works in the background waiting for an application handle or document handle to be closed. Next, in step 11002 this tasks sits idle waiting for a handle to be closed which then proceeds to step 11003. In step 11003, the operating system passes the handle value of the window, application or document that was closed to the File Access Tracking Module.

In step 11004, the handle is no longer subclassed by the File Access Tracking Module. Next, in step 11005, this recently closed window handle is checked to determine if it has a parent handle (which would indicate an MDI document). If a parent handle exists then control proceeds to step 11006 (indicating the recently closed window handle is a document handle), otherwise it proceeds to step 11008 (indicating the recently closed window handle is an application handle).

In step 11006, log file 403 is evaluated and any reference to this document filename and document handle are cleared, leaving the application handle and the application filename in log file 403. Next, in step 11007, the entire log file 403 is analyzed and any reference to the document filename, regardless of the document handle, is also cleared, and control proceeds to step 11010.

In step 11008, log file 403 is evaluated and any reference to this application handle is cleared, regardless of application filename and document information. Next, in step 11009, the entire log file 403 is analyzed and any reference to the application handle, regardless of the application filename, document filename or document handle, is also removed. Control then proceeds to step 11010.

In step 11010, each application handle in log file 403 is checked to see if it is valid in memory. Any handles that are no longer valid in memory are removed from log file 403. Next, in step 11011, processing is returned to the operating system and the File Access Tracking Module resumes as a background task until triggered by another file change notification.

Referring now to FIGS. 12 and 13, there is depicted the flow diagram of the "Template" conversion and retrieving routines, respectively. Templates are duplicates of selected files stored in a specific directory with their graphical thumbnail images and other related information. Retrieving templates is performed by passing template information to the document retrieving routine instead of document information.

In step 12001, the user has selected from the menu to convert a File Snapshot 305 to a "Template". Next, in step 12002 the File Snapshot 305 information is duplicated into a specific data directory and a new Template File Snapshot (not shown) is added to the File Snapshot list 304 in the Templates section. In step 12003, the duplicated Template file is mark with a "READ-ONLY" status to avoid accidental erasure and modifications.

In step 13001, the user has selected a Template File Snapshot. Next, in step 13002 the Template Snapshot information is passed to the document retrieve routine at step 9003 in FIG. 9a, from which point processing of the Template file is performed as discussed above.

The methods and system described herein includes a GUI object created from a screen capture of a document that provides an iconic object that retains associated information such as the current active filename, filename path, file object identifier in memory, application, application path, application object identifier in memory, URL address if applicable, etc. Another aspect is provision for a background task that transparently tracks all opened files by filename, filename path, file object identifier in memory, application, application path, application object identifier in memory, URL address if applicable, etc.

The methods and system described herein provide the ability for the iconic object to bind associated documents automatically to the application which opened or edited the file, independent of the filename extension. It is understood, however, that software according to the present invention could associate a file with an application based on intrinsic file information, such as a file extension or application specific content of the file. Still another aspect is the capability for single click task switching and launching of a specific file within the application that last edited the file. The methods and system described herein provide drag and drop capable iconic desktop (GUI) interface on autohide slideout menu, which facilitates access to desktop icons.

The methods and system described herein allow for re-categorizing files on a user defined relationship independent of the path, in chronological order, and associating them to a visual representation of the file itself, without duplicating or moving the files from their original location. The methods and system described herein provide for gang printing and archiving all or selected files from a bound group by selecting them from the taskbar. The methods and system described herein provide for storing a listing of a user's files, with graphical thumbnails for quick access and better organization. With one click on a thumbnail, the application and file are launched, The present invention provides still other features, such as the ability to create logical groupings of files based on project, subject matter, presentation, priority, chronological, client, etc., without altering or moving the files from their current location on a system. Files can be made into "template files" and used as a base for future use, providing a template feature for applications with no inherent support for such a feature.

Figure 14:
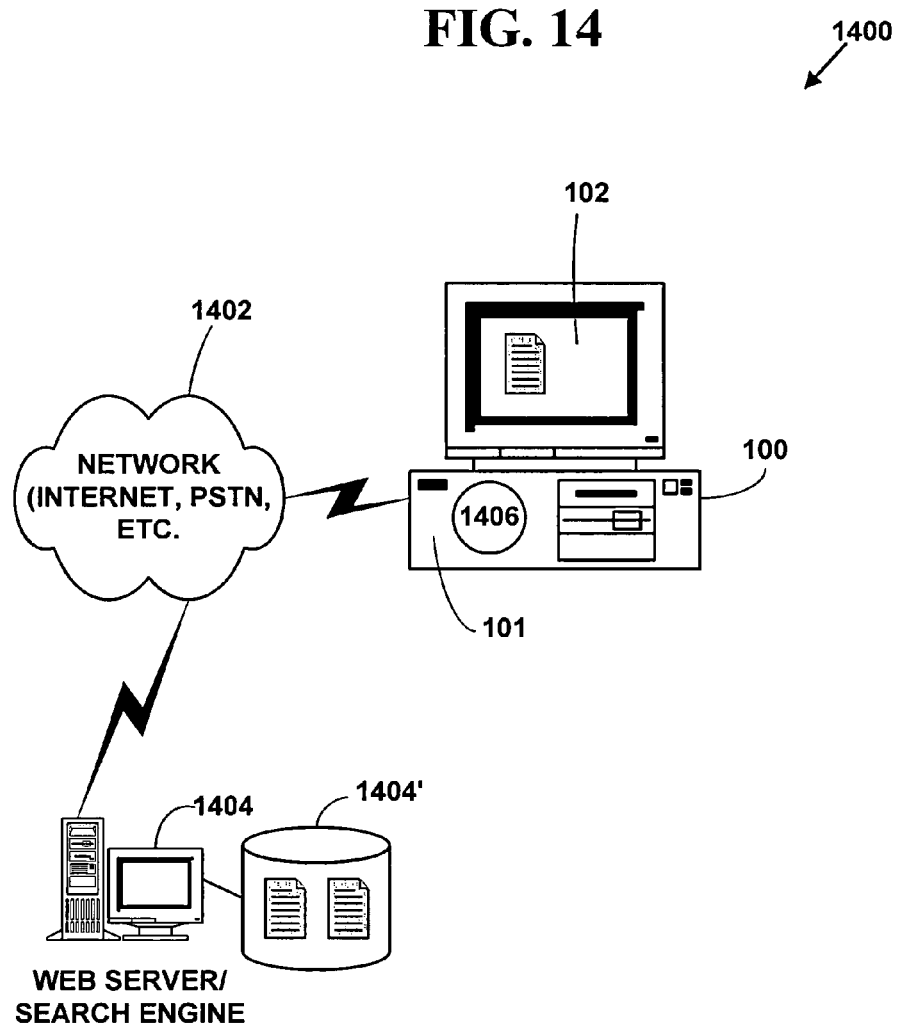
FIG. 14 illustrates a data processing system for additional embodiments of the present invention.

FIG. 14 illustrates a data processing system 1400 for additional embodiments of the present invention. As was described above, computing system 100 may be internet-worked via a local area network or other internetworking systems 1402 with other computers at other locations. The system 1400 includes one or more computers 100. The one or more computers 100 may be replaced with client terminals in communications with one or more servers 1404 with one or more associated databases 1404' including web-site hosting servers, electronic search engine servers, and other types of servers. The one or more computers 100 also may be replaced with other network devices 109, including, but not limited to, a laptop computer, a mobile computer, an Internet appliance, one or two-way pagers, mobile phones (e.g., iPhone, by Apple, Voyager by Verzion, etc.), non-mobile phones or other similar mobile, non-mobile, desktop or hand-held network devices.

The network devices 109 also includes personal game playing devices such as the Play Station Portable (PSP) by Sony, the Gameboy and DS by Nintendo, and others, digital/data assistants (PDAs), (e.g., Palm Pilot by Palm, etc.) personal audio/video devices, (e.g., iPod by Apple, Zune by Microsoft, other MP3/video players, etc.). The network devices 109 also include other game playing devices such as Nintendo Game Cubes, Sony Playstations, Microsoft X-boxes and other types of game playing devices.

Selected ones of the network devices 109 include a display screen 102 with a touch sensitive interface. Such a touch sensitive surface typically has two layers of glass or plastic which can compress and locate a finger or stylus position on a thin metallic, resistive surface. The touch screen may also include projected capacitive technology that does not require actual contact from a finger or stylus. In projective capacitive technology, capacitive sensors behind the glass or plastic sense when a electrical field is disturbed and can detect a finger for stylus from a pre-determined distance away (e.g., 2 mm, etc.). This allows for a more intuitive feel as the finger can glide across the surface.

The one or more computers 100 are also in communications with a communications network 1402 a wired or wireless communications network, including but not limited to, Internet, an intranet, a Local Area Network (LAN), a Wireless LAN (WiLAN), a Wide Area Network (WAN), a Metropolitan Area Network (MAN), a cable television network (CATV), a satellite television network (SATV), a Public Switched Telephone Network (PSTN), Peer-to-Peer (P2P) and other types of communications networks 18.

The communications network 1402 may also include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, ADSL Forum or other standards bodies or forums. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The one or more network devices 100 include a protocol stack with multiple layers based on the Internet Protocol or Opens Systems Interconnection (OSI) reference model.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building-and relying—upon the standards included in the levels below it. The OSI reference model includes from lowest-to-highest, a physical, data-link, network, transport, session, presentation and application layer. The lowest of the seven layers deals solely with hardware links; the highest deals with software interactions at the application-program level.

The communications network 1402 includes, but is not limited to data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 28 and the present invention is not limited to TCP/UDP/IP.

The one of more network devise also include an iconic application 1406 to provide iconic management of documents from web-sites on a computer network (e.g., Internet, intranet, etc.). In one embodiment, iconic application 1406 is an application based on modifications made to applications 401 and/or 402. In another embodiment, ionic application 1406 includes the functionality of applications 401 and/or 402, but includes functionality specifically designed for accessing files on the Internet or other communications networks.

There are many different type of web-sites including electronic content on a spectrum ranging from very simple to very complex. The electronic content includes documents with stored in various different formats including markup languages such as Hyper Text Markup Language (HTML), eXtensible Markup Language (XML), programming languages such as JAVA, C++, C#, computer graphics functionality, multi-media functionality, etc. The present invention creates icons for virtually any type of electronic content found on the Internet and other communications networks.

Electronic search engines are typically used to retrieve information from web-sites. As is known in the art, a "search engine" is an application that searches for electronic documents (i.e. web pages, image, multi-media) based on specified keywords and returns an indexed list of electronic documents that matches the keywords. Most search engine have two parts: (1) a spider application; and (2) an indexer application. The "spider" is an application that fetches the electronic documents. The "indexer" parses the electronic documents and creates an electronic index based on the specified words or ideas included in each electronic document. Examples of electronic search engines include Google, Yahoo, Ask, Alta Vista, Lycos, Galaxy, (galaxy.com), etc. However, the present invention is not limited to such electronic search engines and other search engines can also be used.

Figure 15:
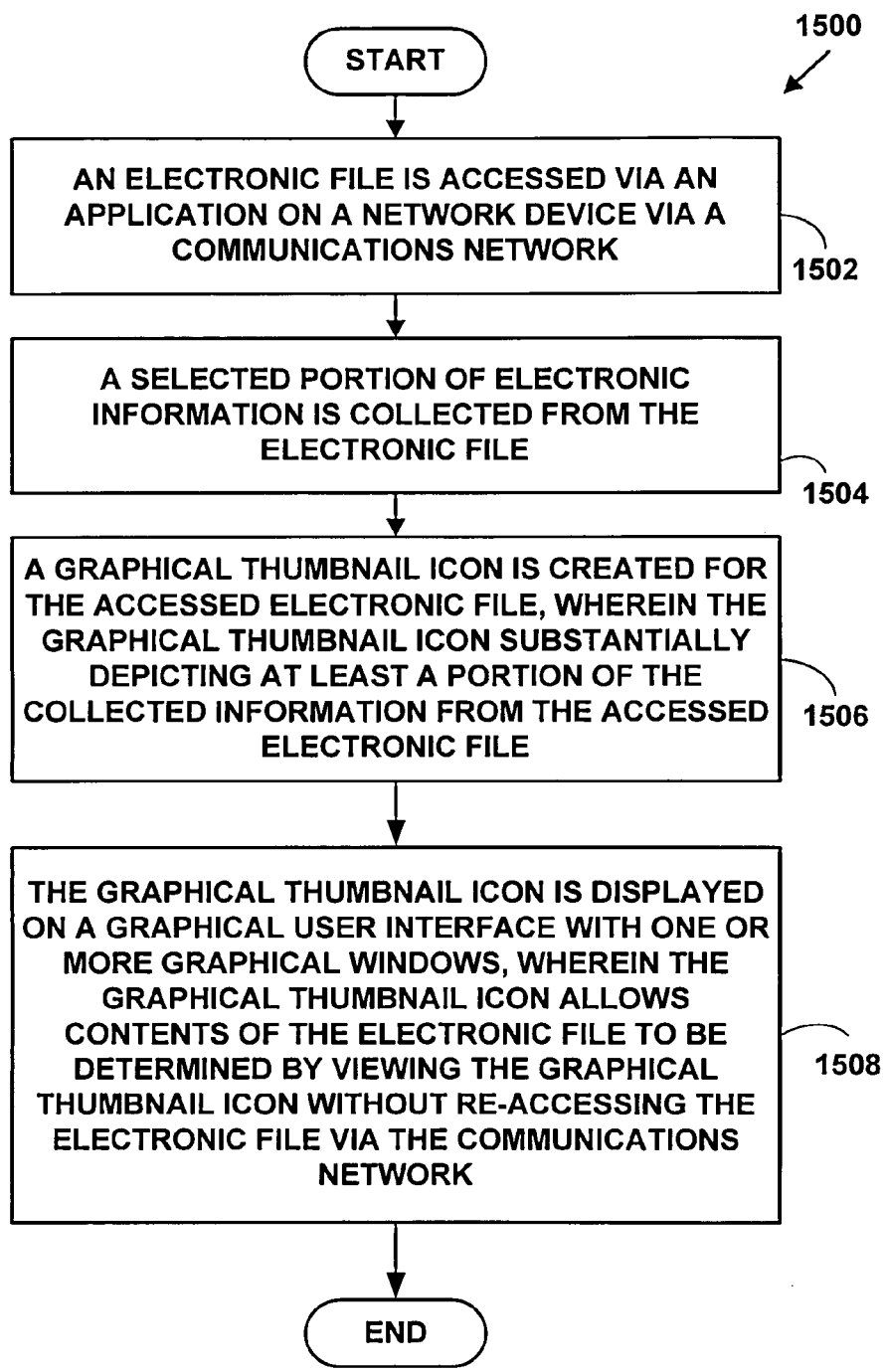
FIG. 15 is a flow diagram illustrating a method for a method of viewing contents of a computer file.

FIG. 15 is a flow diagram illustrating a Method 1500 for viewing contents of a computer file. At Step 1502, an electronic file is accessed via an application on a network device via a communications network. At Step 1504, a selected portion of electronic information is collected from the electronic file. At Step 1506, a graphical thumbnail icon is created for the accessed electronic file. The graphical thumbnail icon substantially depicting at least a portion of the collected information from the accessed electronic file. The substantial portion allows a viewer to determine what information is contained in the electronic file. At Step 1508, the graphical thumbnail icon is displayed on a graphical user interface with one or more graphical windows. The graphical thumbnail icon allows contents of the electronic file to be determined by viewing the graphical thumbnail icon without re-accessing the electronic file via the communications network.

Method 1500 is illustrated with an exemplary embodiment. However, the present invention is not limited to such and embodiment other embodiments can also be used to practice the invention.

In such an exemplary embodiment at Step 1502, an electronic file is accessed via an application (e.g., 401, 402, 1406, etc.) on a network device (100,109, etc.) via the communications network 1402. In one embodiment, the electronic file is an internal file included on the network device. In another embodiment, the electronic file is external to the network device (e.g., files from a web-site, etc.). In another embodiment, the electronic file includes an electronic file including indexed or non-indexed results from an electronic search engine. In one such embodiment, one or more pre-determined keywords were sent to the search engine, to retrieve indexed search engine results. In one embodiment, the application includes applications 401 and/or 402 described above. In another embodiment, the application is another application 1406 designed especially for processing additional external electronic file information obtained by the communications network 1402.

At Step 1504, a selected portion of electronic information is collected from the electronic file. The selected portion may include electronic text information, graphical information, image information, multi-media information or other types of electronic information.

At Step 1506, a thumbnail graphical icon (e.g., 304, FIG. 3) is created for the accessed electronic file. The graphical thumbnail icon substantially depicting at least a portion of the collected information from the accessed electronic file. The substantial portion allows a viewer to determine what information is contained in the electronic file.

At Step 1508, the graphical thumbnail icon is displayed on a graphical user interface with multiple windows. The graphical thumbnail icon allows contents of the electronic file to be determined by viewing the graphical thumbnail icon without re-accessing the electronic file via the communications network 1402. In such an embodiment, the electronic file may be stored in a memory accessible by the application on computing system 100. In another embodiment, the electronic file is not stored in memory and is retrieved via the communications network 1402 when needed.

In one embodiment, the graphical thumbnail icon includes electronic file information components comprising current active filename, filename path, file object identifier in memory, application, application path, application object identifier in memory, Uniform Resource Locator (URL) address(es), search engine index and/or IP address. However, the present invention is not limited to such components, and more fewer or other components can also be used.

In one embodiment, viewing the graphical thumbnail icon without re-accessing the electronic file via the communications network 1402 includes displaying the contents of the electronic file when an input device is placed (e.g., statically placed or dynamically hovered, etc.) over a position location (e.g., X, Y and/or Z coordinates, etc.) for the graphical thumbnail icon on the graphical user interface. For example, a user can place a cursor from a finger, mouse, stylus or other input device over the graphical thumbnail icon to view the contents of the electronic file. In another embodiment, a user can place a cursor from the input device over the graphical thumbnail icon and then send additional selection inputs (e.g., one or more finger pushes, right or left button mouse clicks, etc.) to view the contents of the file. Such an embodiment may require two or more selection inputs to view the contents of the file.

In another embodiment, a designated selection input for the graphical thumbnail icon is received (e.g., a right button mouse click, etc.). The contents of the electronic file are displayed on the graphical user interface based on the designated selection input. However, the contents of the electronic file are viewed via re-accessing the electronic file via the communications network 1402.

In one embodiment, Method 1500 further includes the steps of receiving a selection input for the graphical thumbnail icon and displaying the contents of the electronic file on the graphical user interface based on the selection input, wherein the contents of the electronic file are viewed without re-accessing the electronic file via the communications network 1402. However, the present invention is not limited to such an embodiment and Method 1500 can be practiced with these additional steps.

In one embodiment, a resolution of the contents of the electronic file displayed at Step 1508 can be switched between a reduced sized format and/or a full size format, and back and forth based on selection inputs received from an input device (e.g., designated sequence of finger pushes, mouse clicks, etc.).

In one embodiment, Step 1508 includes displaying a generic graphical thumbnail icon that displays the created graphical thumbnail icon when selected by an input device (e.g., finger, mouse, stylus, etc.). Many layers of indirection and many layers of generic or non-generic graphical icons can be used to practice the invention.

Figure 16:
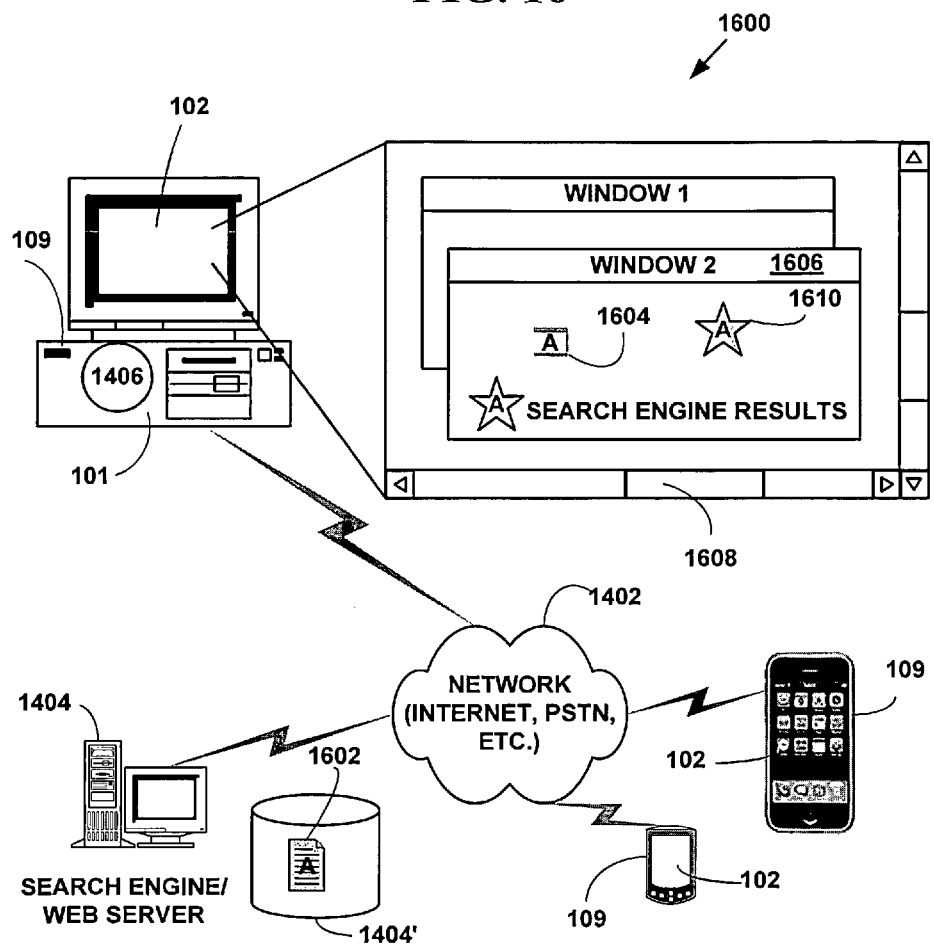
FIG. 16 is a block diagram illustrating additional details of the method of FIG. 15.

FIG. 16 is a block diagram 1600 illustrating additional details of the method of FIG. 15. An electronic file 1602 is accessed (step 1502) and processed (Step 1504) via the communications network 1402. A graphical thumbnail icon 1604 is created (step 1506) and displayed (step 1508) in a graphical window 1606 on the GUI 1608.

In one embodiment, the contents of the electronic file 1606 are displayed at Step 1508 in a full sized format. In another embodiment, the contents of the electronic file 1606 are display in a non-full sized format such as a viewable format of less than 100% resolution used for viewing the electronic file. The viewable display is toggled by selection inputs from an input device (e.g., mouse cursor positions, button clicks, etc.)

In one embodiment, the contents of the electronic file are displayed at Step 1508 in a graphical window 1606 on the GUI 1608 that includes the graphical thumbnail icon 1604. In another embodiment, the contents of the electronic file are displayed in a new graphical window not including the graphical icon 1604.

FIG. 16 also illustrates a generic graphical thumbnail icon 1610 (e.g., a star, etc.) that displays the created graphical thumbnail icon (e.g., 1604, etc.) when selected by an input device (e.g., position finger or cursor over, hover over, finger push or click one or more buttons, tap stylus, etc.)

FIG. 17 is a flow diagram illustrating a Method 1700 for viewing contents of a computer file. At Step 1702, an electronic search engine query is sent to one or more electronic search engines via an application on a network device via communications network, wherein the search query includes one or more keywords. At Step 1704, electronic information including search engine query results is obtained including plural electronic links to plural electronic files on one or more servers on the communications network. At Step 1706, one or more electronic files are accessed via an electronic link included in the search engine query results. At Step 1708, a graphical thumbnail icon is created for each of accessed electronic files, the graphical thumbnail icon substantially depicting at least a portion of the collected information from the accessed electronic file. The substantial portion allows a viewer to determine what information is contained in the electronic file. At Step 1710, the graphical thumbnail icons are displayed in a graphical window on a graphical user interface. Selecting the graphical thumbnail icon allows contents of the electronic file to be determined without re-accessing the electronic file via the communications network.

Method 1700 is illustrated with an exemplary embodiment. However, the present invention is not limited to such and embodiment other embodiments can also be used to practice the invention.

In such an exemplary embodiment at Step 1702, an electronic search engine query is sent to one or more electronic search engines via an application (e.g., 401, 402, 1406, etc.) on a network device (e.g., 100, 109, etc.) via the (Internet, PSTN, etc.) 1402. The search query includes one or more keywords.

At Step 1704, electronic information including search engine query results is obtained including plural electronic links (e.g., Universal Resource Locators (URL), other types of electronic links, etc.) to plural electronic files on one or more servers 1404 on the communications network 1402.

At Step 1706, one or more electronic files (e.g., 1602, etc.) are accessed via an electronic link included in the search engine query results.

At Step 1708, a graphical thumbnail icon (1604, etc.) is created for each of accessed electronic files, the graphical thumbnail icon substantially depicting at least a portion of the collected information from the accessed electronic file.

At Step 1710, the graphical thumbnail icons are displayed in a graphical window 1606 on a graphical user interface 1608. Selecting the graphical thumbnail icon 1604 allows contents of the electronic file to be determined without re-accessing the electronic file via the communications network 1404.

In one embodiment, Method 1700 further includes the steps of receiving a selection input for the graphical thumbnail icon 1604 and displaying the contents of the electronic file 1602 on the graphical user interface 1608 based on the selection input, wherein the contents of the electronic file are viewed without re-accessing the electronic file 1602 via the communications network 1404. However, the present invention is not limited to such an embodiment and Method 1700 can be practiced with these additional steps.

In another embodiment, a designated selection input for the graphical thumbnail icon 1604 is received (e.g., a finger push, a right or left button mouse click, etc.). The contents of the electronic file 1602 are displayed in a graphical window 1606 on the graphical user interface 1608 based on the designated selection input. However, the contents of the electronic file are viewed via re-accessing the electronic file via the communications network 1402.

In one embodiment, the contents of the electronic file 1606 are displayed at Step 1710 in a full sized format. In another embodiment, the contents of the electronic file 1606 are display in a non-full sized format such as a viewable format of less than 100% resolution used for viewing the electronic file.

In one embodiment, the contents of the electronic file are displayed at Step 1710 in a graphical window 1606 on the GUI 1608 that includes the graphical thumbnail icon 1604. In another embodiment, the contents of the electronic file are displayed in a new graphical window not including the graphical thumbnail icon 1604.

In one embodiment, a resolution of the contents of the electronic file displayed at Step 1710 can be switched between a reduced sized format and/or a full size format, and back and forth based on selection inputs received from an input device (e.g., designated sequence of finger pushes, mouse clicks, etc.).

In one embodiment, Step 1710 includes displaying plural generic graphical thumbnail icons (e.g., 1610) that displays the created graphical thumbnail icon (e.g., 1604) when selected by an input device (e.g., finger, mouse, stylus, etc.).

The system and method described herein provide storing, navigating and accessing files within an operating system on a stand alone device or on a networked device with files from plural internal or external files (e.g., web-site files, etc.) through the use of graphical thumbnail icons representing a graphical display of a substantial portion of information obtained from within an electronic document.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method of viewing contents of a computer file on a network device, comprising:

sending a search engine query via an application on a network device with one or more processors with a display screen with a touch sensitive interface via communications network to one or more external electronic search engine servers each with one or more processors, wherein the search query includes one or more search keywords;

obtaining on the application electronic information including search engine query results, wherein the search engine query results include a plurality electronic links to a plurality of electronic files on one or more other server network devices each with one or more processors on the communications network;

accessing one or more electronic files via one or more electronic links included in the search engine query results;

storing contents of the one or more electronic files in a memory accessible by the application on the network device;

collecting a selected portion of electronic information from the accessed one or more electronic files;

creating graphical thumbnail icons for the accessed one or more electronic files, the graphical thumbnail icons substantially depicting at least a portion of the collected information from the accessed one or more electronic files;

displaying the graphical thumbnail icons on a graphical user interface with one or more graphical windows via the application, wherein selecting the graphical thumbnail icons allows contents of the electronic files to be determined from the memory without re-accessing the electronic files via the communications networks;

receiving a first selection input on the touch sensitive interface from a static placement or a dynamic hover of an input device at a first position location on a selected graphical thumbnail icon displayed in a graphical window on the graphical user interface on the display screen on the network device;

displaying contents of an electronic file associated with the selected graphical thumbnail icon in a full size format in the graphical window, wherein the graphical window still includes the selected graphical thumbnail icon;

receiving a second selection input on the touch sensitive interface from a second static placement or a second dynamic hover of the input device at a second position location on the selected graphical thumbnail icon displayed in the graphical window on the graphical user interface on the display screen on the network device;

displaying contents of the electronic file associated with the selected graphical thumbnail icon in a reduced size format in the graphical window, wherein the graphical window still includes the selected graphical thumbnail icon, wherein the reduced size format is a viewable format of less than 100% resolution; and switching between displaying the full size format and the reduced sized format in the graphical window upon receiving one or more third selection inputs on the touch sensitive interface at a third position location on the selected graphical thumbnail icon displayed in the graphical window on the graphical user interface on the display screen on the network device, wherein the graphical window still includes the selected graphical thumbnail icon.

2. The method of claim 1 wherein the one or more electronic files include a mark-up language file, a graphics file, an image file, or a multi-media file from a web-site.

3. The method of claim 1 wherein the one or more electronic files includes an electronic file including results from an electronic search engine for one or more selected keywords sent to the electronic search engine.

4. The method of claim 1 wherein the communications network includes Internet an intranet, or a public switched telephone network.

5. The method of claim 1 wherein the created graphical thumbnail icons include electronic file information comprising current active local filename, filename path, file object identifier in memory, application, application path, application object identifier in memory and Uniform Resource Locator (URL) address.

6. The method of claim 1 wherein the input device includes a human finger, mouse or stylus.

7. The method of claim 1 wherein the step of displaying the created graphical thumbnail icons includes displaying a generic graphical thumbnail icon that displays an associated non-generic created graphical thumbnail icon when selected by an input device.

8. The method of claim 7 further comprising:
receiving a selection input for a selected generic graphical thumbnail icon on the touch sensitive interface;
displaying a selected created graphical thumbnail icon associated with the selected generic graphical thumbnail icon; and
displaying the contents of an electronic file associated with the selected created graphical icon in the graphical window on the graphical user interface based on the selection input, wherein the contents of the electronic file are viewed without re-accessing the electronic file via the communications network.

9. The method of claim 8, wherein the displaying the contents step includes also displaying the contents of the electronic file in a new graphical window on the graphical user interface.

10. The method of claim 1 further comprising:
receiving a designated sequence of selection inputs on the touch sensitive interface for a selected created graphical thumbnail icon; and
displaying contents of an electronic file associated with the selected created graphical thumbnail icon in the graphical window on the graphical user interface based on the designated sequence of selection inputs, wherein the contents of the electronic file are viewed via re-accessing the electronic file via the communications network.

11. The method of claim 1 wherein the network device includes a mobile phone, a personal game playing device or a personal audio-video device including a display screen with a touch sensitive surface.

12. The method of claim 1 wherein the plurality of electronic links include a plurality of Universal Resource Locators (URL)s.

13. The method of claim 1 wherein the switching step includes switching a display the contents of an accessed electronic file between a reduced sized format and a full size format based on a sequence of received selection inputs from an input device on the touch sensitive interface, wherein the input device includes a human finger.

14. A non-transitory computer readable medium having stored therein a plurality of instructions for causing one or more processors to execute the steps of:
sending a search engine query via an application on a network device with one or more processors with a display screen with a touch sensitive interface via communications network to one or more external electronic search engine servers each with one or more processors, wherein the search query includes one or more search keywords;
obtaining on the application electronic information including search engine query results, wherein the search engine query results include a plurality electronic links to a plurality of electronic files on one or more other server network devices each with one or more processors on the communications network;
accessing one or more electronic files via one or more electronic links included in the search engine query results;
storing contents of the one or more electronic files in a memory accessible by the application on the network device;
collecting a selected portion of electronic information from the accessed one or more electronic files;
creating graphical thumbnail icons for the accessed one or more electronic files, the graphical thumbnail icons substantially depicting at least a portion of the collected information from the accessed one or more electronic files;
displaying the graphical thumbnail icons on a graphical user interface with one or more graphical windows via the application, wherein selecting the graphical thumbnail icons allows contents of the electronic files to be determined from the memory without re-accessing the electronic files via the communications network;
receiving a first selection input on the touch sensitive interface from a static placement or a dynamic hover of an input device at a first position location on a selected graphical thumbnail icon displayed in a graphical window on the graphical user interface on the display screen on the network device;

displaying contents of an electronic file associated with the selected graphical thumbnail icon in a full size format in the graphical window, wherein the graphical window still includes the selected graphical thumbnail icon;

receiving a second selection input on the touch sensitive interface from a second static placement or a second dynamic hover of the input device at a second position location on the selected graphical thumbnail icon displayed in the graphical window on the graphical user interface on the display screen on the network device;

displaying contents of the electronic file associated with the selected graphical thumbnail icon in a reduced size format in the graphical window, wherein the graphical window still includes the selected graphical thumbnail icon, wherein the reduced size format is a viewable format of less than 100% resolution; and switching between displaying the full size format and the reduced sized format in the graphical window upon receiving one or more third selection inputs on the touch sensitive interface at a third position location on the selected graphical thumbnail icon displayed in the graphical window on the graphical user interface on the display screen on the network device, wherein the graphical window still includes the selected graphical thumbnail icon.

15. A system for displaying contents of an electronic file, comprising in combination:

means for sending a search engine query via an application on a network device with one or more processors with a display screen with a touch sensitive interface via communications network to one or more external electronic search engine servers each with one or more processors, wherein the search query includes one or more search keywords;

means for obtaining on the application electronic information including search engine query results, wherein the search engine query results include a plurality electronic links to a plurality of electronic files on one or more other server network devices each with one or more processors on the communications network;

means for accessing an electronic file on an application a network device with one or more processors via a communications network;

means collecting a selected portion of electronic information from the electronic file;

means for creating a graphical thumbnail icon for the accessed electronic file, the graphical thumbnail icon substantially depicting at least a portion of the collected information from the accessed electronic file;

means for displaying the graphical thumbnail icon on a graphical user interface with one or more graphical windows, wherein selecting the graphical thumbnail icon allows contents of the electronic file to be determined without re-accessing the electronic file via the communications network, wherein the network device includes a mobile phone, a personal game playing device or a personal audio-video device including a display screen with a touch sensitive surface;

means for sending a search engine query to one or more electronic search engine servers each with one or more processors via a communications network, wherein the search query includes one or more keywords;

means for obtaining electronic information including search engine query results, wherein the search engine query results include a plurality electronic links to a plurality of electronic files on one or more servers on the communications network;

means for storing contents of the one or more electronic files in a memory accessible by the application on the network device;

means for accessing one or more electronic files via an electronic link included in the search engine query results;

means displaying a generic graphical thumbnail icon that displays a created graphical thumbnail icons when selected by a selection input;

means for receiving a first selection input on the touch sensitive interface from a static placement or a dynamic hover of an input device at a first position location on a selected graphical thumbnail icon displayed in a graphical window on the graphical user interface on the display screen on the network device;

means for displaying contents of an electronic file associated with the selected graphical thumbnail icon in a full size format in the graphical window, wherein the graphical window still includes the selected graphical thumbnail icon;

means for receiving a second selection input on the touch sensitive interface from a second static placement or a second dynamic hover of the input device at a second position location on the selected graphical thumbnail icon displayed in the graphical window on the graphical user interface on the display screen on the network device;

means for displaying contents of the electronic file associated with the selected graphical thumbnail icon in a reduced size format in the graphical window, wherein the graphical window still includes the selected graphical thumbnail icon, wherein the reduced size format is a viewable format of less than 100% resolution; and means for switching between displaying the full size format and the reduced sized format in the graphical window upon receiving one or more third selection inputs on the touch sensitive interface at a third position location on the selected graphical thumbnail icon displayed in the graphical window on the graphical user interface on the display screen on the network device, wherein the graphical window still includes the selected graphical thumbnail icon.

* * * * *